(12) United States Patent
Piper et al.

(10) Patent No.: US 11,294,426 B1
(45) Date of Patent: Apr. 5, 2022

(54) CASE FOR PORTABLE ELECTRONIC COMPUTING DEVICE

(71) Applicant: Pioneer Square Brands, Inc., Seattle, WA (US)

(72) Inventors: Brian Lewis Piper, Seattle, WA (US); Michael Cooper Ferren, Camus, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/349,903

(22) Filed: Jun. 16, 2021

(51) Int. Cl.
*G06F 1/16* (2006.01)

(52) U.S. Cl.
CPC .......... *G06F 1/1628* (2013.01); *G06F 1/1654* (2013.01); *G06F 1/1669* (2013.01)

(58) Field of Classification Search
CPC ..... G06F 1/1628; G06F 1/1654; G06F 1/1669
USPC ......................................................... 206/320
See application file for complete search history.

(56) References Cited

U.S. PATENT DOCUMENTS

| | | | | |
|---|---|---|---|---|
| 8,599,542 B1 * | 12/2013 | Healey | ................... | G06F 1/1626 455/575.8 |
| 8,837,131 B1 * | 9/2014 | Colby | ................... | G06F 1/1667 361/679.29 |
| 9,036,340 B1 * | 5/2015 | Colby | ................... | G06F 1/1669 361/679.55 |
| 9,256,256 B2 * | 2/2016 | Liang | ..................... | G06F 1/1681 |
| 9,426,905 B2 * | 8/2016 | Bathiche | ............... | G06F 1/1681 |
| 9,715,254 B2 * | 7/2017 | Mori | ..................... | G06F 1/1662 |
| 9,846,451 B2 * | 12/2017 | Koo | ....................... | G06F 1/1654 |
| 10,231,350 B2 * | 3/2019 | Katsuyama | ........... | G06F 1/1632 |
| 10,474,199 B2 * | 11/2019 | Longo | .................. | H04B 1/3888 |
| 10,615,538 B2 * | 4/2020 | Cho | ....................... | G06F 1/1654 |
| 11,042,197 B2 * | 6/2021 | Li | ......................... | G06F 1/1616 |
| 2016/0139635 A1 * | 5/2016 | Gibson | ................ | G06F 1/1616 361/679.55 |

FOREIGN PATENT DOCUMENTS

WO WO-2015130293 A1 * 9/2015 ........... G06F 1/1626

* cited by examiner

*Primary Examiner* — Nidhi Thaker
(74) *Attorney, Agent, or Firm* — Grandview Law

(57) ABSTRACT

Systems and methods are involved with a tablet case assembly including a case frame for removably containing a tablet computing device, the case frame including a tablet containment area that is obscured from view when the case frame contains a tablet computing device; a keyboard assembly including a keyboard, and an engagement member coupled to the keyboard, the engagement member for removably engaging with the posterior side of the third wall of the case frame; and at least one fastener for removably securing the engagement member of the keyboard assembly with the posterior side of the third wall of the case frame. In addition, other aspects are described in the claims, drawings, and text forming a part of the present disclosure.

12 Claims, 17 Drawing Sheets

FIG. 2

CASE FOR PORTABLE ELECTRONIC COMPUTING DEVICE

SUMMARY

In one or more aspects, a system can include, but is not limited to a tablet case assembly including, but not limited to, (I) a case frame configured to removably contain a tablet computing device, the case frame including, but not limited to, (A) an interior back surface, (B) a first wall including, but not limited to, a first length, an anterior side, a posterior side, a proximate interior portion of the anterior side, and a distal exterior portion of the anterior side, the proximate interior portion of anterior side distanced closer to the interior back surface than the distal exterior portion of the anterior side is distanced to the interior back surface, (C) a second wall including, but not limited to, a first length, an anterior side, a posterior side, a proximate interior portion of the anterior side, and a distal exterior portion of the anterior side, the proximate interior portion of the anterior side distanced closer to the interior back surface than the distal exterior portion of the anterior side is distanced to the interior back surface, (D) a third wall including, but not limited to, a first length, an anterior side, a posterior side, a proximate interior surface of the anterior side, and a distal exterior portion of the anterior side, the proximate interior surface of the anterior side distanced closer to the interior back surface than the distal exterior portion of the anterior side is distanced to the interior back surface, (E) a fourth wall including, but not limited to, a first length, an anterior side, a posterior side, and a proximate interior portion of the anterior side, and a distal exterior portion of the anterior side, the proximate interior portion of the anterior side distanced closer to the interior back surface than the distal exterior portion of the anterior side is distanced to the interior back surface, (i) the first wall extending along the first length of the first wall parallel to the first length of the third wall, (ii) the first wall extending along the first length of the first wall perpendicularly to the first length of the second wall and the first length of the fourth wall, (iii) the first wall, the second wall, the third wall, and the fourth wall coupled to the interior back surface to extend away therefrom with the proximate interior portion of the anterior side of the first wall, the proximate interior portion of the anterior side of the second wall, the proximate interior surface of the anterior side of the third wall, and the proximate interior portion of the anterior side of the fourth wall along with the interior back surface at least in part forming a tablet containment area that is obscured from view when the case frame contains a tablet computing device, (iv) the distal exterior portion of the anterior side of the first wall, the distal exterior portion of the anterior side of the second wall, the distal exterior portion of the anterior side of the third wall, and the distal exterior portion of the anterior side of the fourth wall being unobscured from view when the case frame contains a tablet computing device, (II) a keyboard assembly including, but not limited to, (A) a keyboard, (B) an engagement member coupled to the keyboard, the engagement member configured to removably engage with the posterior side of the third wall of the case frame; and (III) at least one fastener configured for removably securing the engagement member of the keyboard assembly with the posterior side of the third wall of the case frame. The engagement member can include, but is not limited to, an exterior surface and when the at least one fastener is removably securing the engagement member with the posterior side of the third wall of the case frame, the at least one fastener is only accessible from the exterior surface of the engagement member. The posterior side of the third wall of the case frame can include, but is not limited to, an exterior third wall surface and at least one aperture of first type, the at least one aperture of first type having an opening being planarly collocated with the exterior third wall surface of the case frame to receive the at least one fastener when the at least one fastener is removably securing the engagement member with the posterior side of the third wall of the case frame. When the at least one fastener is removably securing the engagement member with the posterior side of the third wall of the case frame, the at least one fastener is only accessible from the proximate interior surface of the anterior side of the third wall of the case frame. The proximate interior surface of the anterior side of the third wall of the case frame can include, but is not limited to, at least one aperture of second type, the at least one aperture of second type having an opening planarly collocated with the proximate interior surface to receive the at least one fastener when the at least one fastener is removably securing the engagement member with the posterior side of the third wall of the case frame. The at least one aperture of second type being without an opening being planarly collocated with the exterior third wall surface of the case frame. A tablet computing device can be contained by the tablet containment area of the case frame, when the at least one fastener is removably securing the engagement member with the posterior side of the third wall of the case frame, the at least one fastener can be blocked by the tablet computing device from being accessible from the proximate interior surface of the anterior side of the third wall of the case frame. When the at least one fastener is removably securing the engagement member with the posterior side of the third wall of the case frame, the at least one fastener can be only accessible from the proximate interior surface of the anterior side of the third wall of the case frame if the tablet computing device removed from being contained by the tablet containment area of the case frame. With at least one second fastener, the engagement member can include, but is not limited to, an exterior surface and when the at least one second fastener is removably securing the engagement member with the posterior side of the third wall of the case frame the at least one second fastener is only accessible from the exterior surface of the engagement member. A tablet computing device can be contained by the tablet containment area of the case frame. The anterior side of the third wall of the case frame can include, but is not limited to, at least one aperture of second type, the at least one aperture of second type having an opening planarly collocated with the proximate interior surface to receive the at least one fastener, and the at least one aperture of second type can be blocked by the tablet computing device from being accessible. With at least one second fastener, the posterior side of the third wall of the case frame can include, but is not limited to, an exterior third wall surface and at least one aperture of first type, the at least one aperture of first type having an axis line of first type and an opening being planarly collocated with the exterior third wall surface of the case frame to receive the at least one fastener when the at least one fastener is removably securing the engagement member with the posterior side of the third wall of the case frame, and the proximate interior surface of the anterior side of the third wall of the case frame can include, but is not limited to, at least one aperture of second type, the at least one aperture of second type having an axis line of second type and an opening planarly collocated with the proximate interior surface to receive the at least one second fastener when the at least one second fastener is removably securing the engagement member with the posterior side of the third wall of the case frame. The axis line of first type and the axis line of second type share a common axis. With at least one second fastener, the posterior side of the third wall of the case frame can include, but is not limited to, an exterior third wall surface and at least one aperture of first type, the at least one aperture of first type having an axis line of first type and an opening being planarly collocated with the exterior third wall surface of the case frame to receive the at least one fastener when the at least one fastener is removably securing the engagement member with the posterior side of the third wall of the case frame, and the proximate interior surface of the anterior side of the third wall of the case frame can include, but is not limited to, at least one aperture of second type, the at least one aperture of second type having an axis line of second type and an opening planarly collocated with the proximate interior surface to receive the at least one second fastener when the at least one second fastener is removably securing the engagement member with the posterior side of the third wall of the case frame, the axis line of first type and the axis line of second type are parallel to one another and displaced from one another. The at least one fastener can include, but is not limited to, at least one fastener type selected from the following list of fastener types: screw, bolt, nail, push clip, and peg.

In one or more aspects a system can include, but is not limited to (I) a case frame configured to removably contain a tablet computing device, the case frame including, but not limited to, (A) an interior back surface, (D) a third wall including, but not limited to, a first length, an anterior side, a posterior side, a proximate interior surface of the anterior side, and a distal exterior portion of the anterior side, the proximate interior surface of the anterior side distanced closer to the interior back surface than the distal exterior portion of the anterior side is distanced to the interior back surface, (iii) the third wall coupled to the interior back surface to extend away therefrom with the proximate interior surface of the anterior side of the third wall along with the interior back surface at least in part forming a tablet containment area that is obscured from view when the case frame contains a tablet computing device, (II) a keyboard assembly including, but not limited to, (A) a keyboard, (B) an engagement member coupled to the keyboard, the engagement member configured to removably engage with the posterior side of the third wall of the case frame; and (III) at least one fastener configured for removably securing the engagement member of the keyboard assembly with the posterior side of the third wall of the case frame. When the at least one fastener is removably securing the engagement member with the posterior side of the third wall of the case frame, the at least one fastener is only accessible from the proximate interior surface of the anterior side of the third wall of the case frame. The proximate interior surface of the anterior side of the third wall of the case frame can include, but is not limited to, at least one aperture of second type, the at least one aperture of second type having an opening planarly collocated with the proximate interior surface to receive the at least one fastener when the at least one fastener is removably securing the engagement member with the posterior side of the third wall of the case frame. A tablet computing device can be contained by the tablet containment area of the case frame. When the at least one fastener is removably securing the engagement member with the posterior side of the third wall of the case frame, the at least one fastener can be blocked by the tablet computing device from being accessible from the proximate interior surface of the anterior side of the third wall of the case frame.

In one or more aspects a system can include a tablet case assembly including, but not limited to: (I) a case frame including, but not limited to, (D) a third wall including, but not limited to, a first length, an anterior side, a posterior side, a proximate interior surface of the anterior side, and a distal exterior portion of the anterior side, the proximate interior surface of the anterior side distanced closer to the interior back surface than the distal exterior portion of the anterior side is distanced to the interior back surface, (iii) the third wall the proximate interior surface of the anterior side of the third wall at least in part forming a tablet containment area that is obscured from view when the case frame contains a tablet computing device, (II) a keyboard assembly including, but not limited to, (A) a keyboard, (B) an engagement member coupled to the keyboard, the engagement member configured to removably engage with the posterior side of the third wall of the case frame; and (III) at least one fastener configured for removably securing the engagement member of the keyboard assembly with the posterior side of the third wall of the case frame. A tablet computing device being contained by the tablet containment area of the case frame. The anterior side of the third wall of the case frame can include, but is not limited to, at least one aperture of second type, the at least one aperture of second type having an opening planarly collocated with the proximate interior surface to receive the at least one fastener, and the at least one aperture of second type can be blocked by the tablet computing device from being accessible. The system can include at least one second fastener. The posterior side of the third wall of the case frame can include, but is not limited to, an exterior third wall surface and at least one aperture of first type, the at least one aperture of first type having an axis line of first type and an opening being planarly collocated with the exterior third wall surface of the case frame to receive the at least one fastener when the at least one fastener is removably securing the engagement member with the posterior side of the third wall of the case frame, and the proximate interior surface of the anterior side of the third wall of the case frame can include, but is not limited to, at least one aperture of second type, the at least one aperture of second type having an axis line of second type and an opening planarly collocated with the proximate interior surface to receive the at least one second fastener when the at least one second fastener is removably securing the engagement member with the posterior side of the third wall of the case frame, the axis line of first type and the axis line of second type can share a common axis.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of a Case for Portable Electronic Computing Device systems, articles of manufacture, compositions of matter for same that may provide context, for instance, in introducing one or more processes and/or devices described herein.

DETAILED DESCRIPTION

Figure 1:
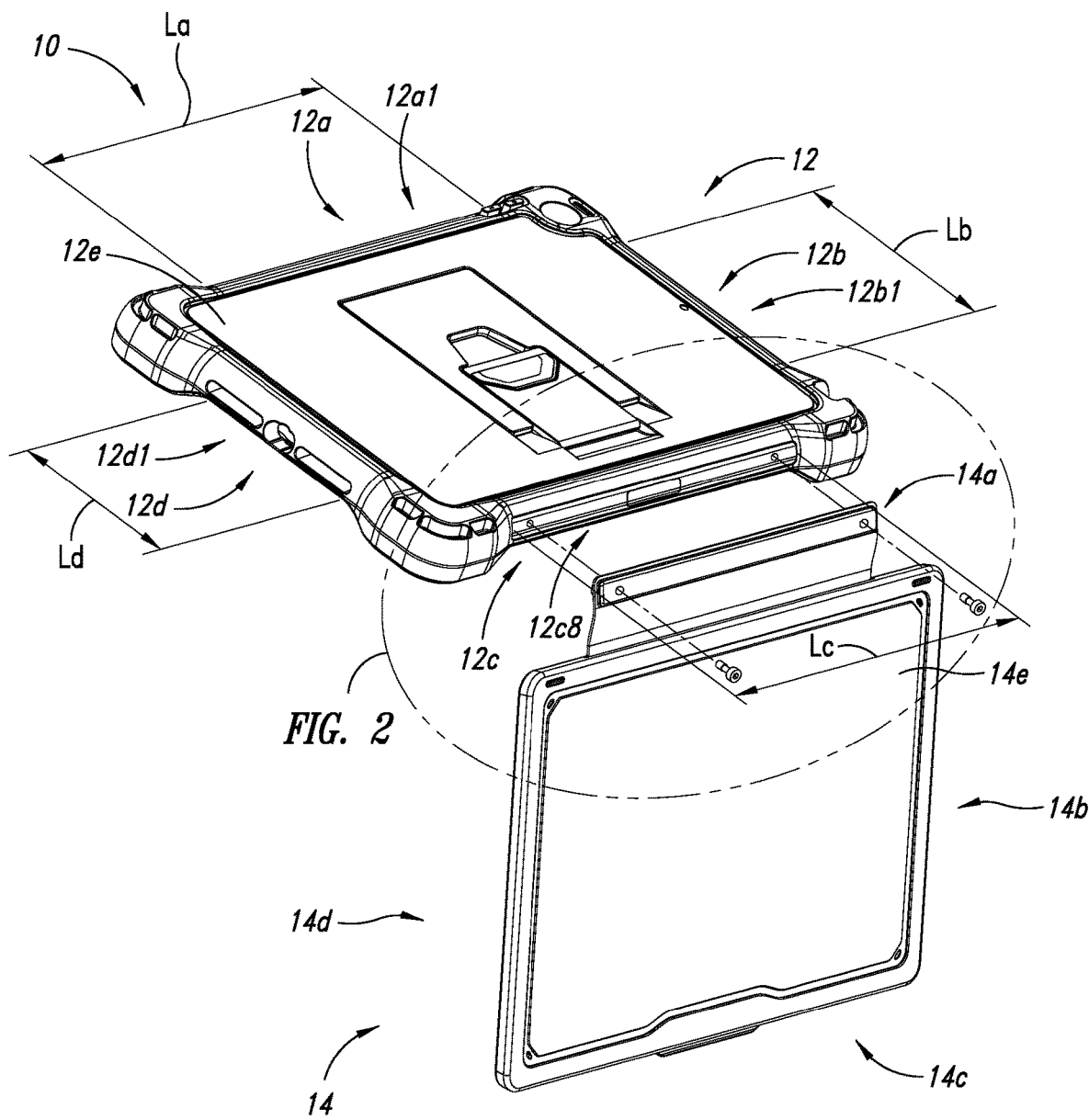
FIG. 1 is a posterior perspective view a first implementation of a tablet case assembly for a tablet computing device.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Figure 15:
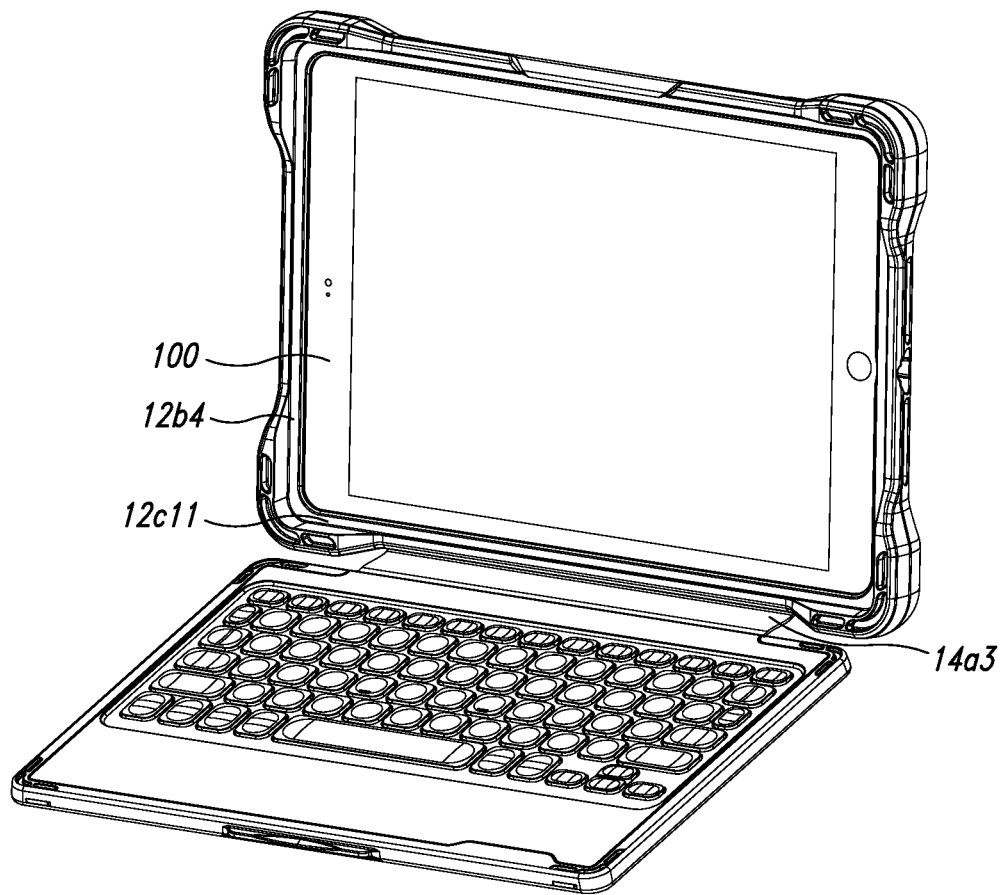
FIG. 15 is an anterior perspective view of the tablet case assembly containing a tablet computing device.

Turning to FIG. 1, depicted therein is a posterior perspective view a first implementation of tablet case assembly 10 for tablet computing device 100 (shown in FIG. 15). The tablet case assembly 10 is shown to include case frame 12 and keyboard assembly 14. The case frame 12 is shown to include a first wall 12a with first length La and posterior side 12a1, second wall 12b with first length Lb and posterior side 12b1, third wall 12c with first length Lc and posterior side 12c8, fourth wall 12d with first length Ld and posterior side 12d1, and exterior surface 12e. The keyboard assembly 14 is shown to include first side 14a, second side 14b, third side 14c, fourth side 14d, and exterior surface 14e.

Figure 2:
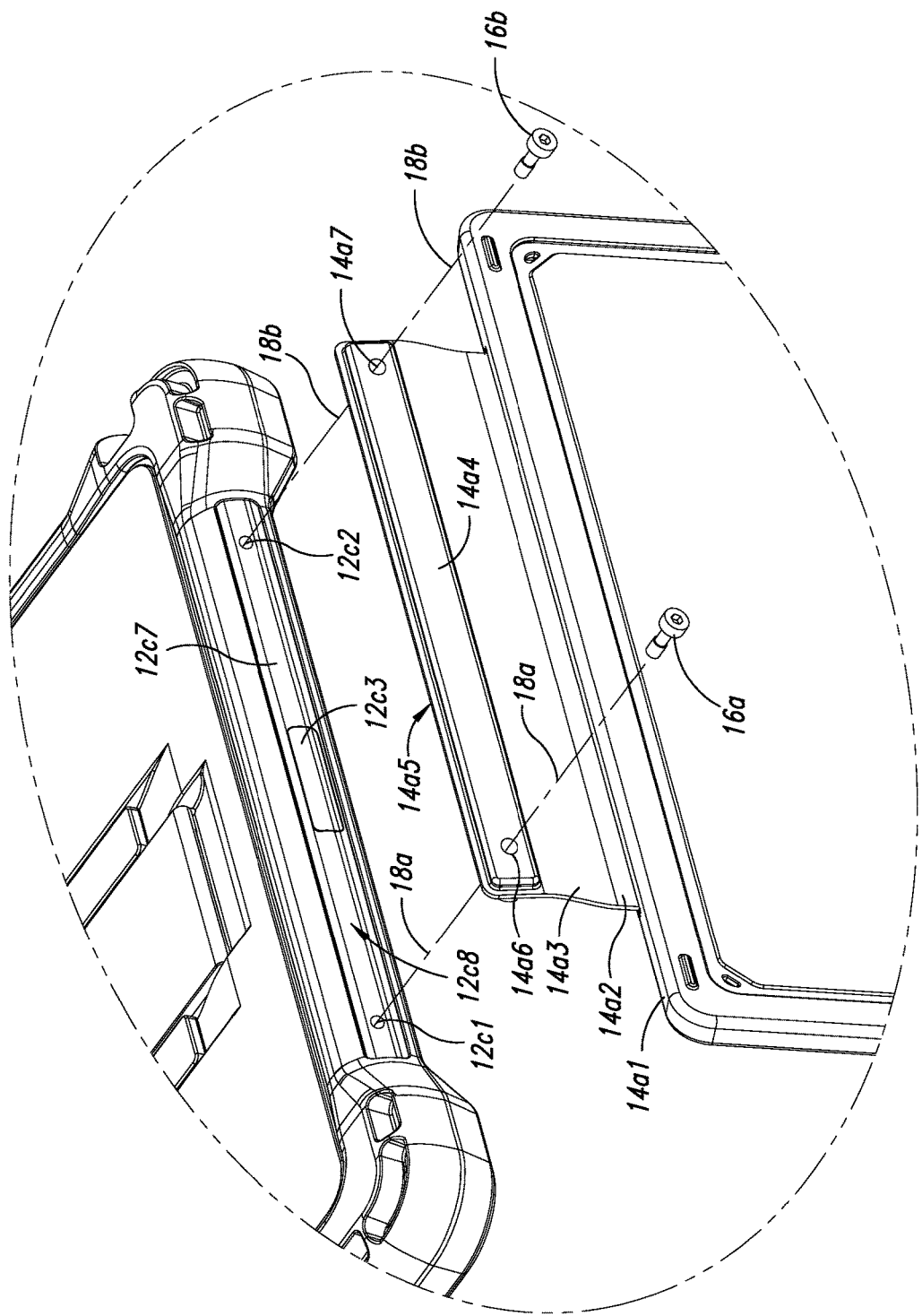
FIG. 2 is an enlarged posterior perspective view of the dashed-circle portion labeled "FIG. 2" shown in FIG. 1.

Turning to FIG. 2, depicted therein is an enlarged posterior perspective view of the dashed-circle portion of the tablet case assembly 10 first implementation demarcated labeled by "FIG. 2" in FIG. 1. The third wall 12c of case frame 12 is shown to include aperture of first type 12c1 to receive fastener 16a along axis line of first type 18a, aperture of first type 12c2 to receive fastener 16b along axis line of first type 18b, plug receiving aperture 12c3, and exterior third wall surface 12c7.

The first side 14a of keyboard assembly 14 is shown to include exterior edge 14a1, rectangular support 14a2 extending from exterior edge 14a1, flexible hinge 14a3 extending from exterior edge 14a1, engagement member 14a5 extending from exterior edge 14a1 and shown to have exterior surface 14a4 with aperture of first type 14a6 to receive fastener 16a along axis line of first type 18a and with aperture of first type 14a7 to receive fastener 16b along axis line of first type 18b.

Figure 3:
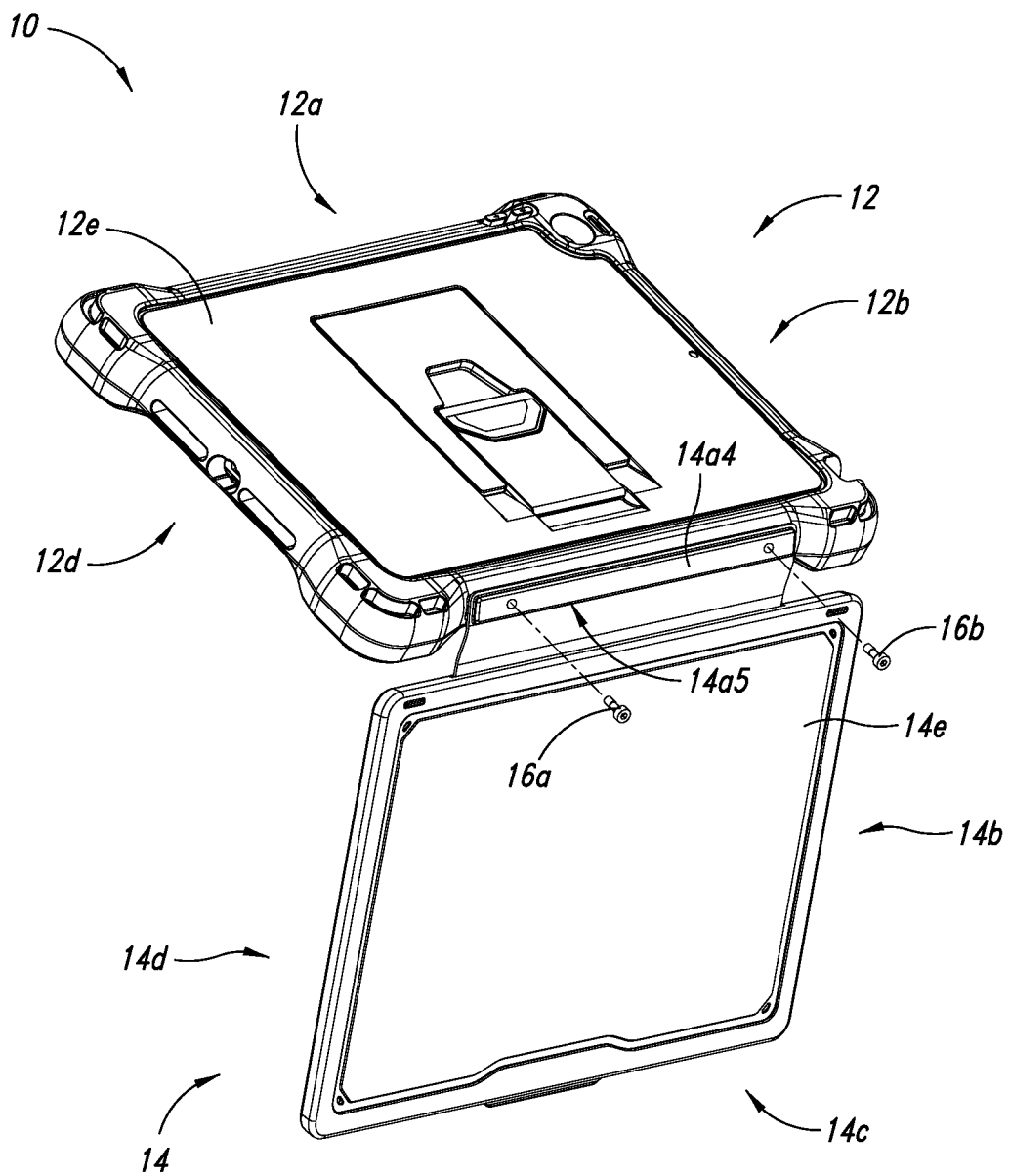
FIG. 3 is a posterior perspective view of the tablet case assembly first implementation of FIG. 1.

Turning to FIG. 3, depicted therein is a posterior perspective view of the tablet case assembly 10 first implementation of FIG. 1 with engagement member 14a5 of first side 14a of keyboard assembly 14 shown to be adjacent exterior third wall surface 12c7 of third wall 12c of case frame 12.

Figure 4:
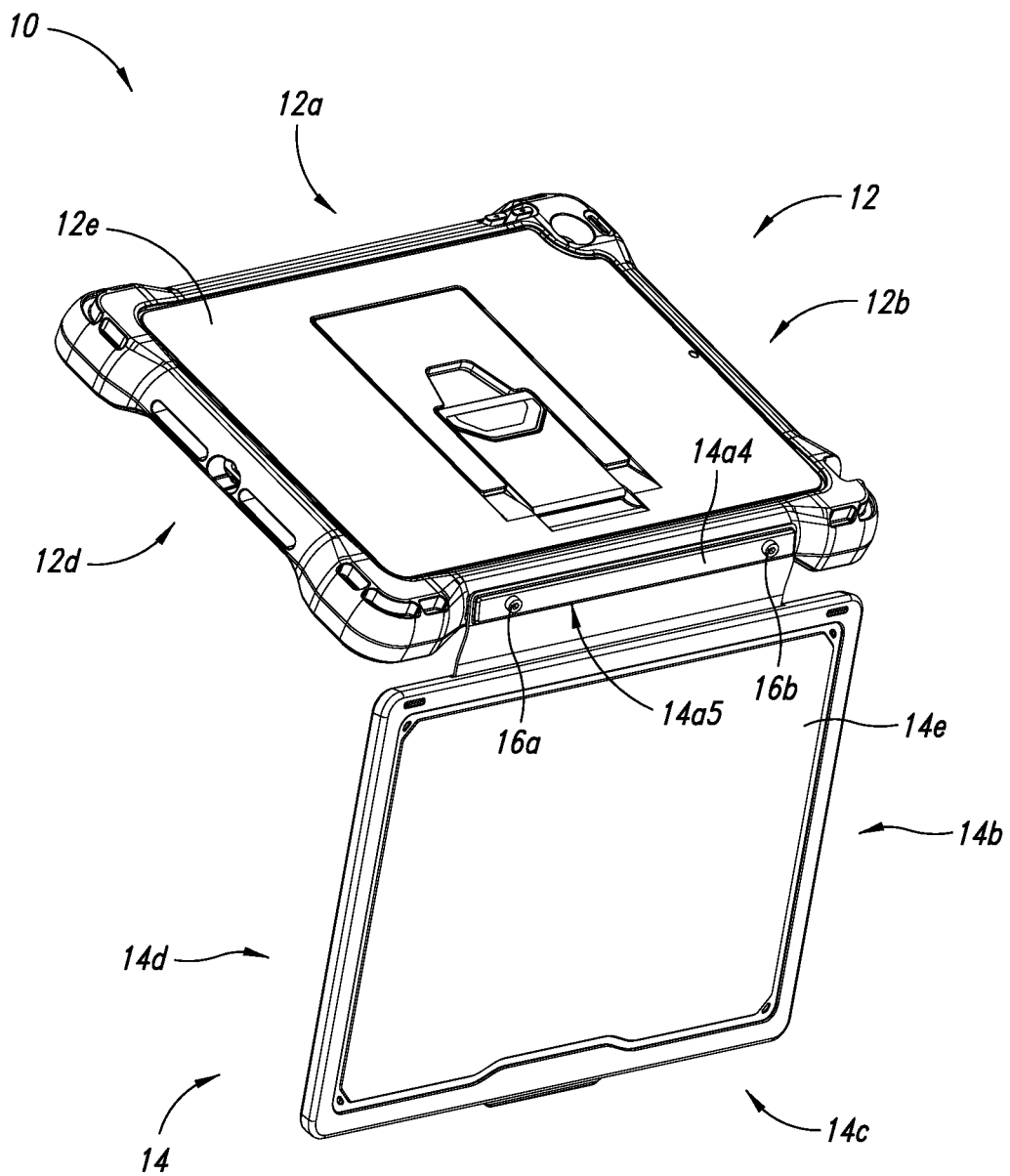
FIG. 4 is a posterior perspective view of the tablet case assembly first implementation of FIG. 1.

Turning to FIG. 4, depicted therein is a posterior perspective view of the tablet case assembly 10 first implementation of FIG. 1 with engagement member 14a5 of first side 14a of keyboard assembly 14 shown to be coupled with exterior third wall surface 12c7 of third wall 12c of case frame 12.

Figure 5:
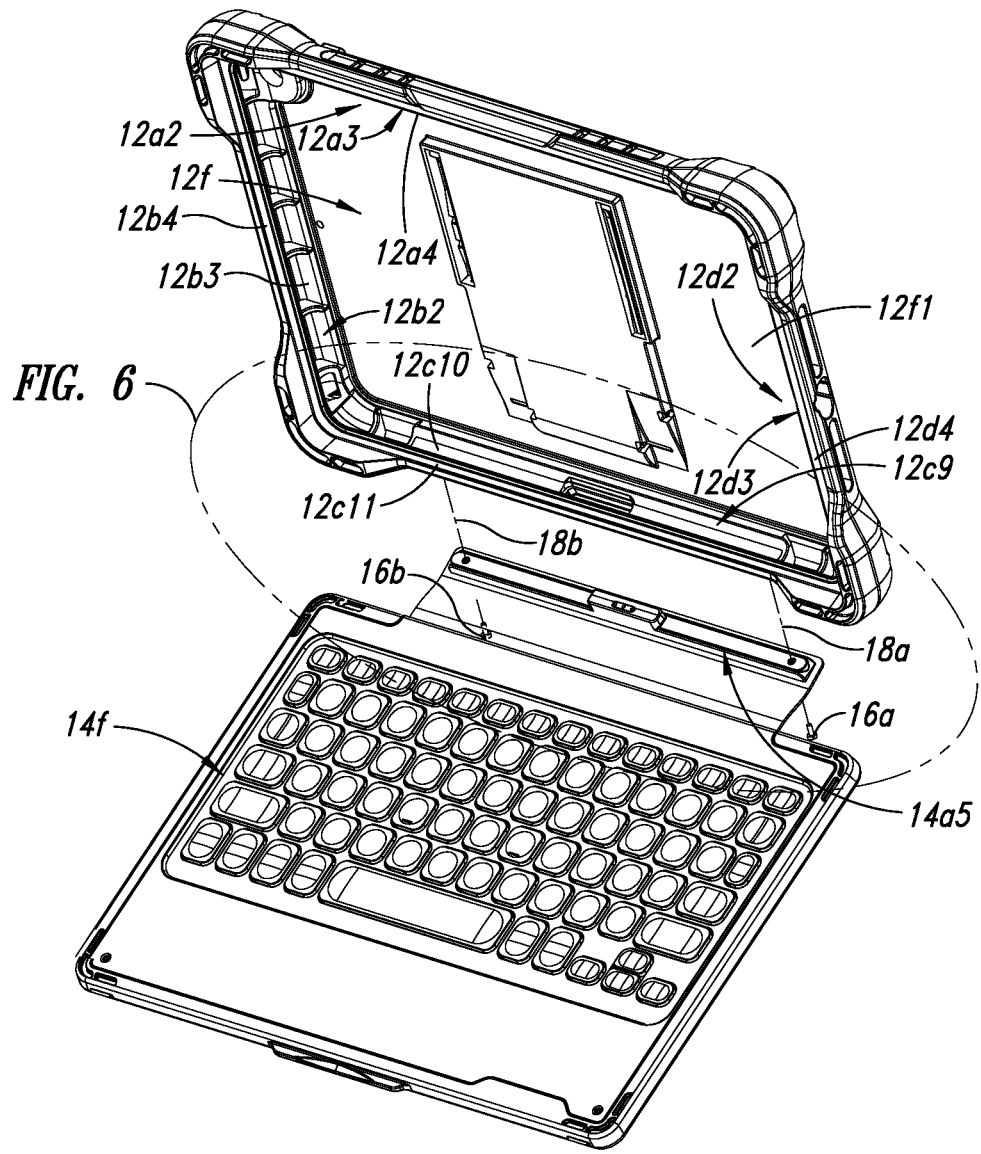
FIG. 5 is an anterior perspective view of the tablet case assembly first implementation of FIG. 1.

Turning to FIG. 5, depicted therein is an anterior perspective view of the tablet case assembly 10 first implementation of FIG. 1. The first wall 12a of case frame 12 is shown to include anterior side 12a2, proximate interior portion 12a3, and distal exterior portion 12a4. The second wall 12b of case frame 12 is shown to include anterior side 12b2, proximate interior portion 12b3, and distal exterior portion 12b4. The third wall 12c of the case frame 12 is shown to include anterior side 12c9, proximate interior surface 12c10, and distal exterior portion 12c11. The fourth wall 12d of the case frame 12 is shown include anterior side 12d2, proximate interior portion 12d3, and distal exterior portion 12d4. The case frame 12 is shown to include tablet containment area 12f with interior back surface 12f1. The keyboard assembly 14 is shown to include keyboard 14f.

Figure 6:
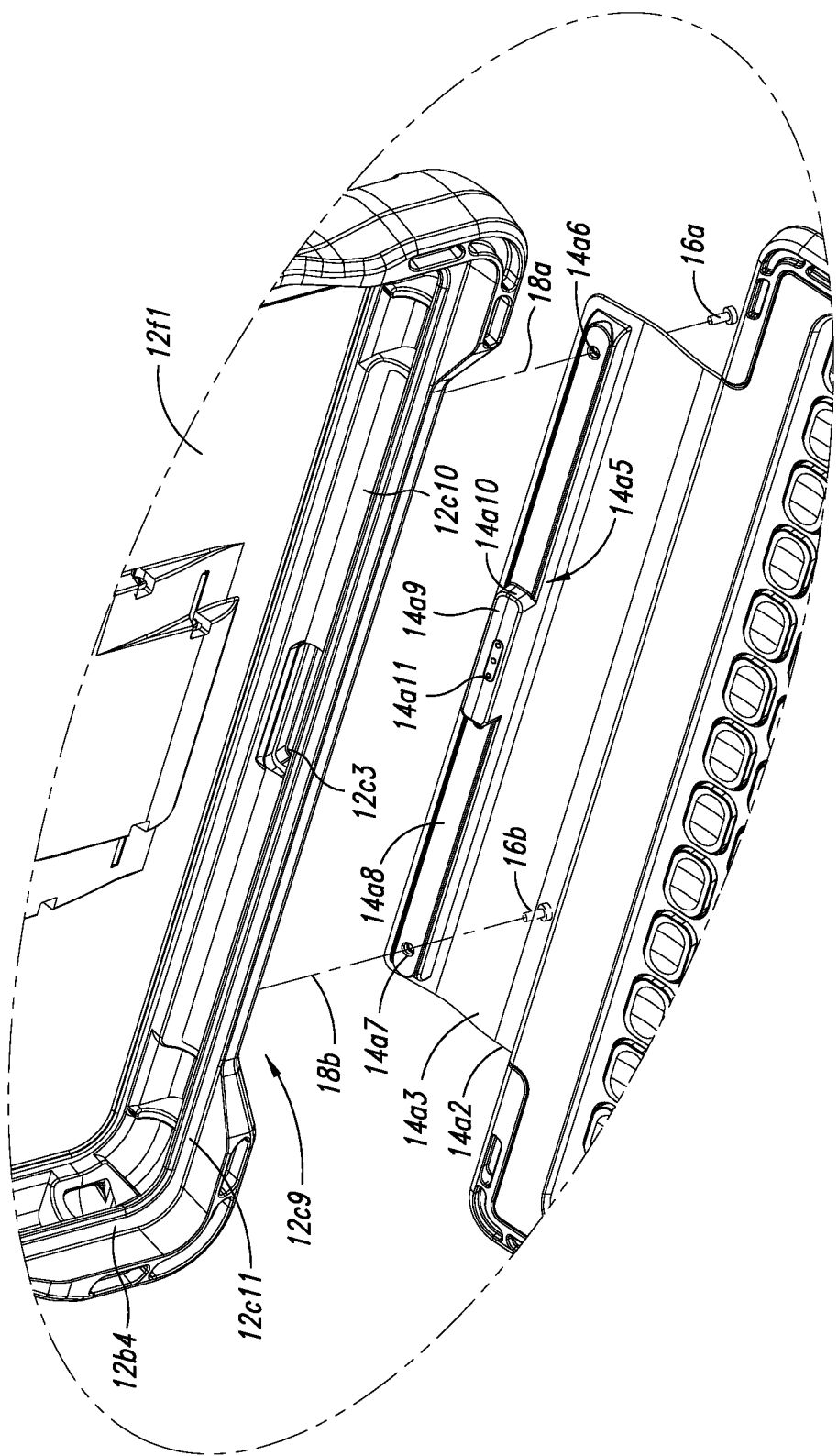
FIG. 6 is an enlarged posterior perspective view of the dashed-circle portion labeled "FIG. 5" in FIG. 5.

Turning to FIG. 6, depicted therein is an enlarged posterior perspective view of the dashed-circle portion of the tablet case assembly 10 first implementation labeled "FIG. 5" in FIG. 5. The first side 14a of keyboard assembly 14 is shown to include interfacial surface 14a8, signal plug 14a9 (for insertion into plug receiving aperture 12c3), plug side surface 14a10, and signal connector 14a11 (for communicating with tablet computing device 100 shown in FIG. 15).

Figure 7:
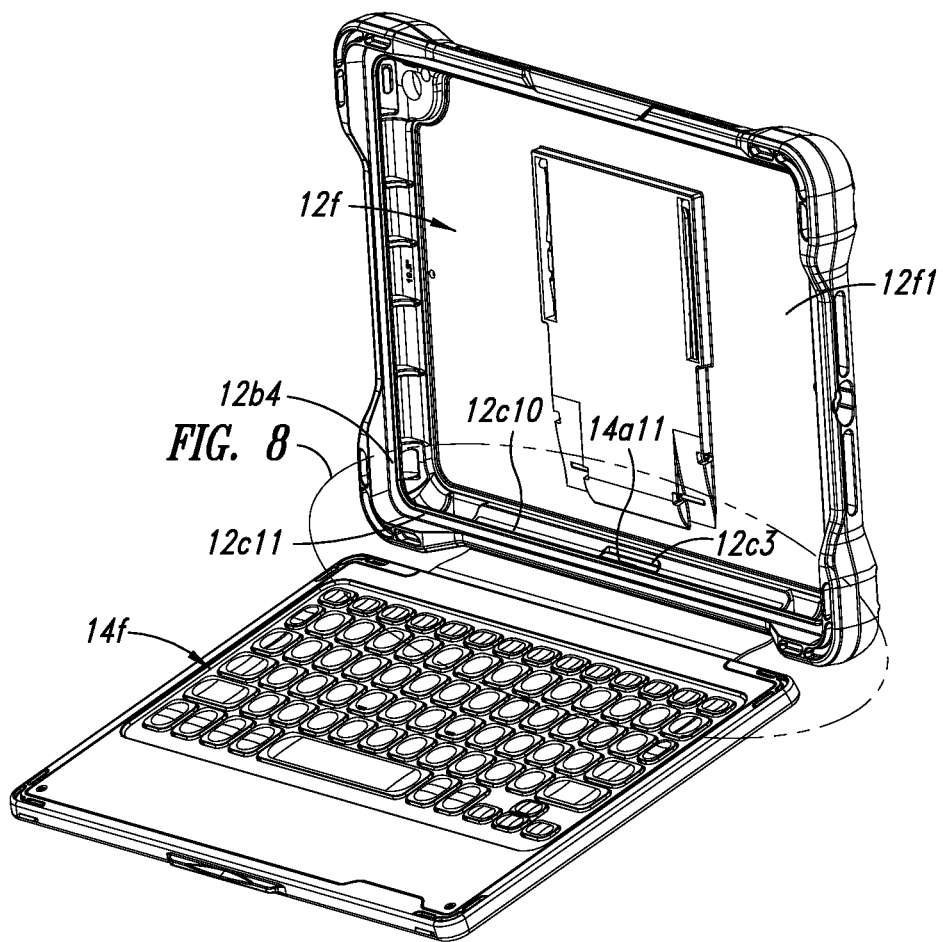
FIG. 7 is an anterior perspective view of the tablet case assembly first implementation of FIG. 1.

Turning to FIG. 7, depicted therein is an anterior perspective view of the tablet case assembly 10 first implementation of FIG. 1 with keyboard assembly 14 coupled with case frame 12.

Figure 8:
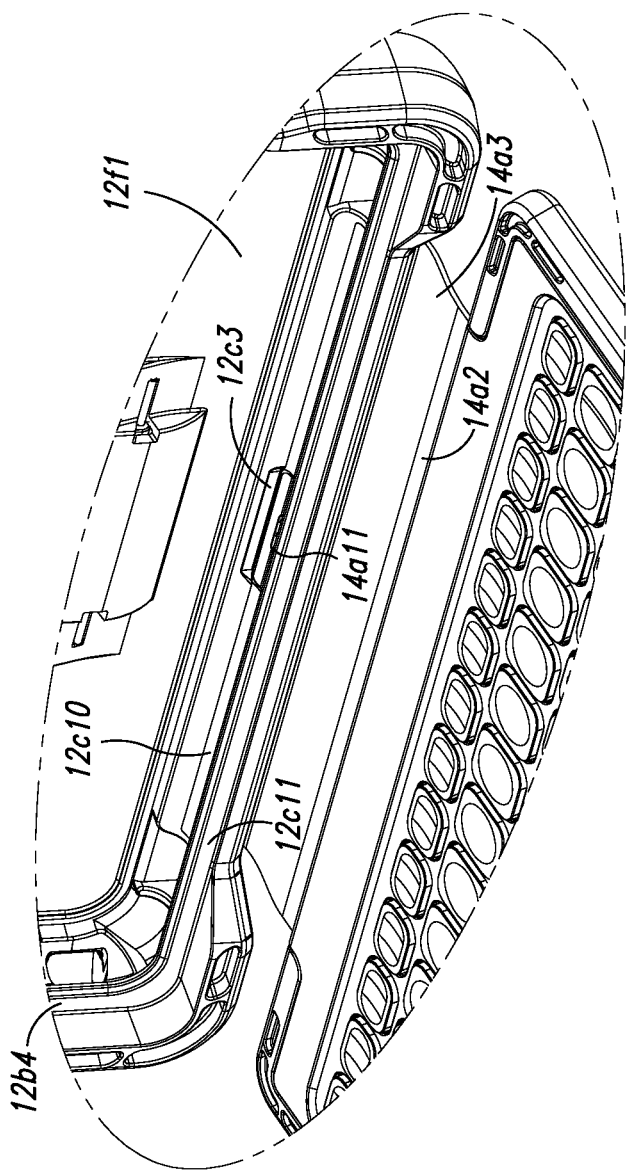
FIG. 8 is an enlarged anterior perspective view of the dashed-circle portion labeled "FIG. 8" in FIG. 7.

Turning to FIG. 8, depicted therein is an enlarged anterior perspective view of the dashed-circle portion of the tablet case assembly 10 first implementation labeled "FIG. 8" in FIG. 7 with keyboard assembly 14 coupled with case frame 12.

Figure 9:
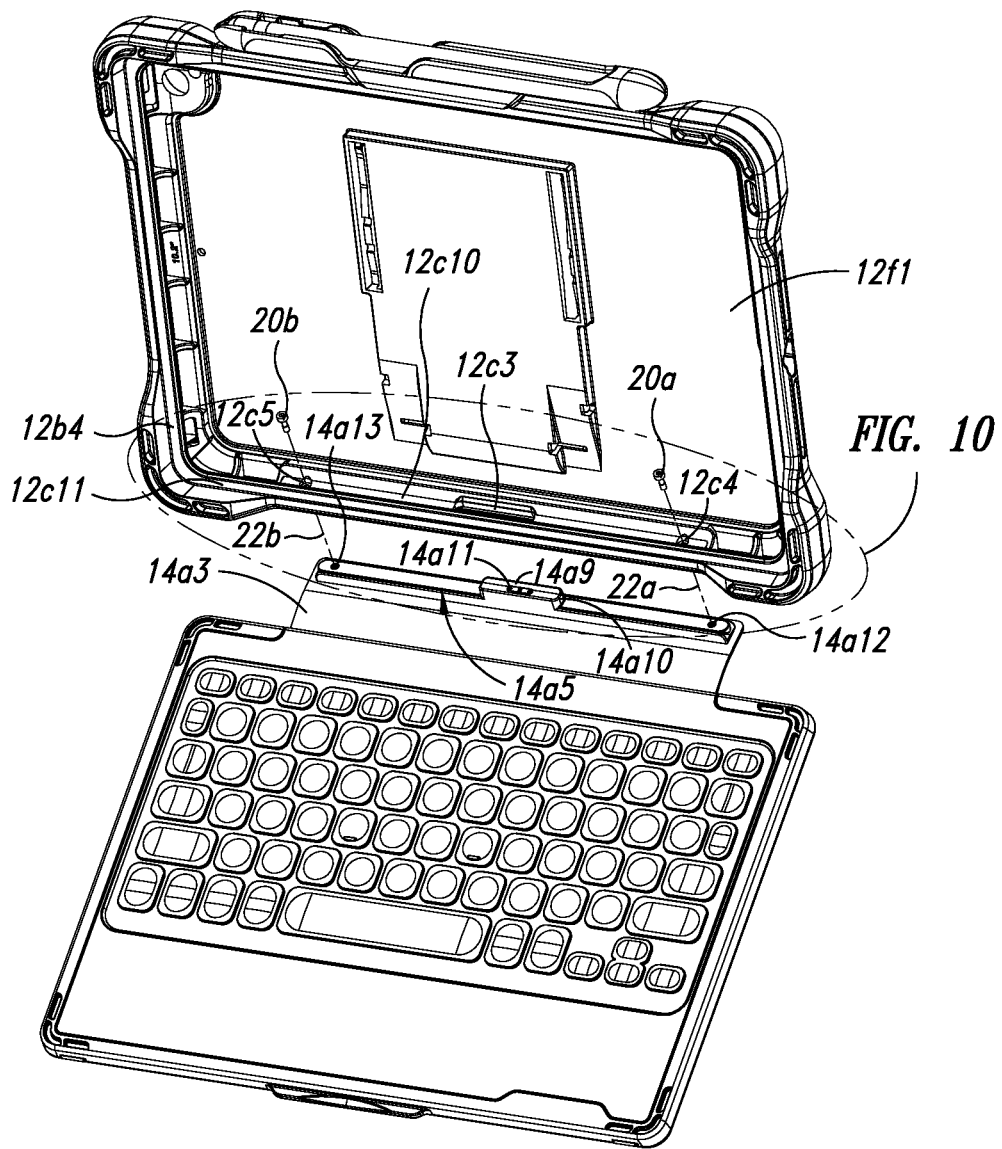
FIG. 9 is an anterior perspective view of a second implementation of a tablet case assembly.

Turning to FIG. 9, depicted therein is an anterior perspective view of a second implementation of the tablet case assembly 10. The third wall 12c of case frame 12 is shown to include aperture of second type 12c4 and aperture of second type 12c5. The first side 14a of keyboard assembly 14 is shown to include aperture of second type 14a12 and aperture of second type 14a13.

Figure 10:
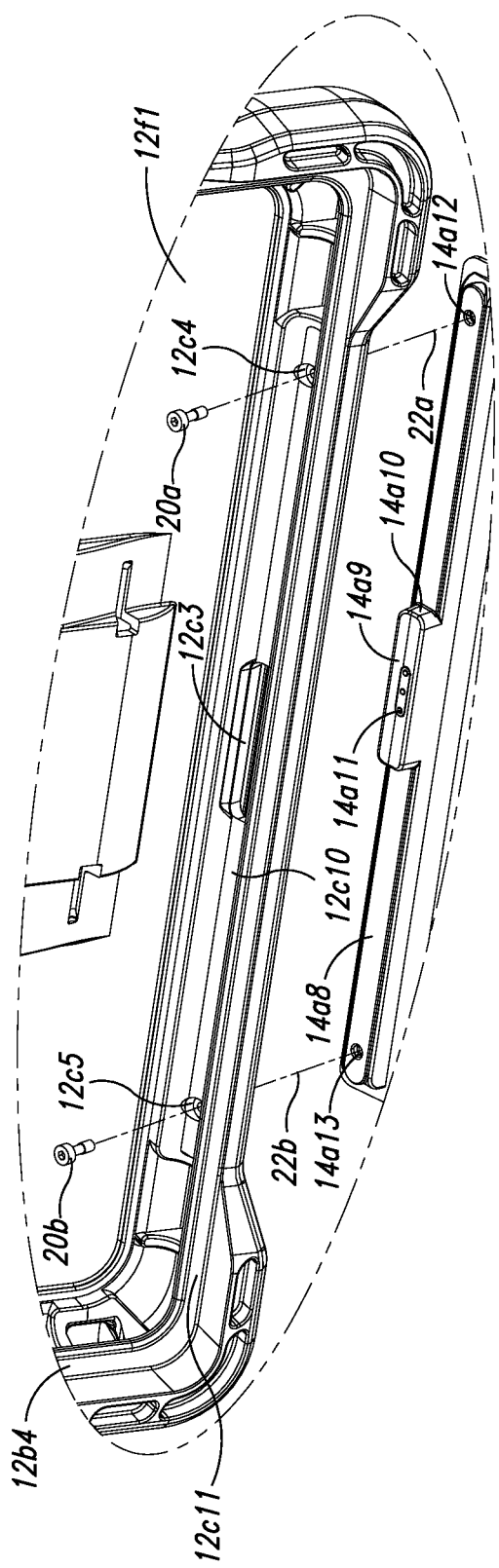
FIG. 10 is an enlarged anterior perspective view of the dashed-circle portion labeled "FIG. 10" in FIG. 9.

Turning to FIG. 10, depicted therein is an enlarged anterior perspective view of the dashed-circle portion of the tablet case assembly 10 second implementation labeled "FIG. 10" in FIG. 9.

Figures 11, 12:
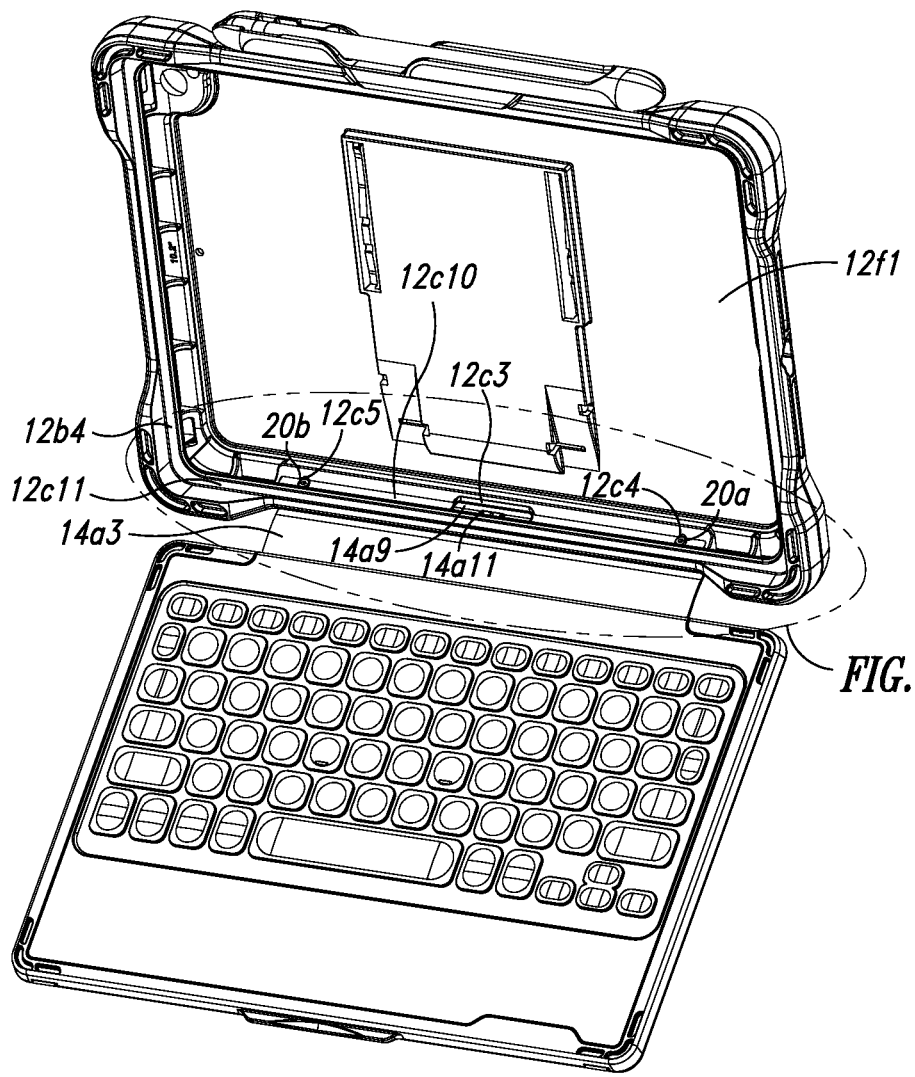
FIG. 11 is an anterior perspective view of the tablet case assembly second implementation of FIG. 9.
FIG. 12 is an enlarged anterior perspective view of the dashed-circle portion labeled "FIG. 12" in FIG. 11.
Figure 12:
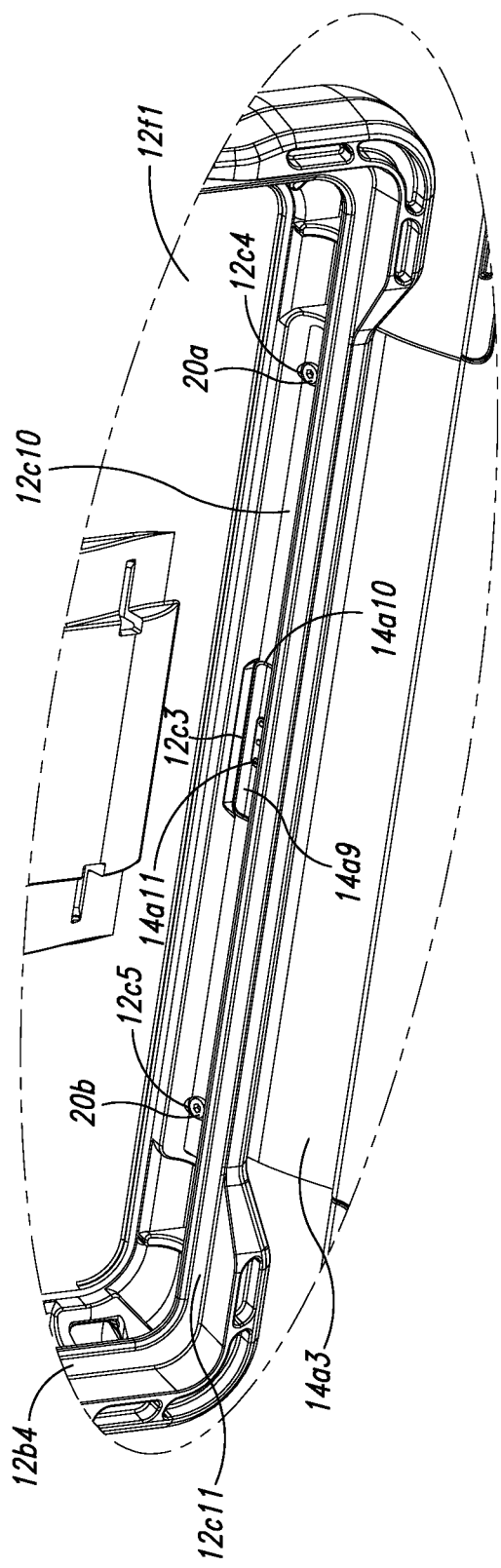

Turning to FIG. 11, depicted therein is an anterior perspective view of the tablet case assembly 10 second implementation of FIG. 9.

Turning to FIG. 12, depicted therein is an enlarged anterior perspective view of the tablet case assembly 10 second implementation labeled "FIG. 12" in FIG. 11.

Figure 13:
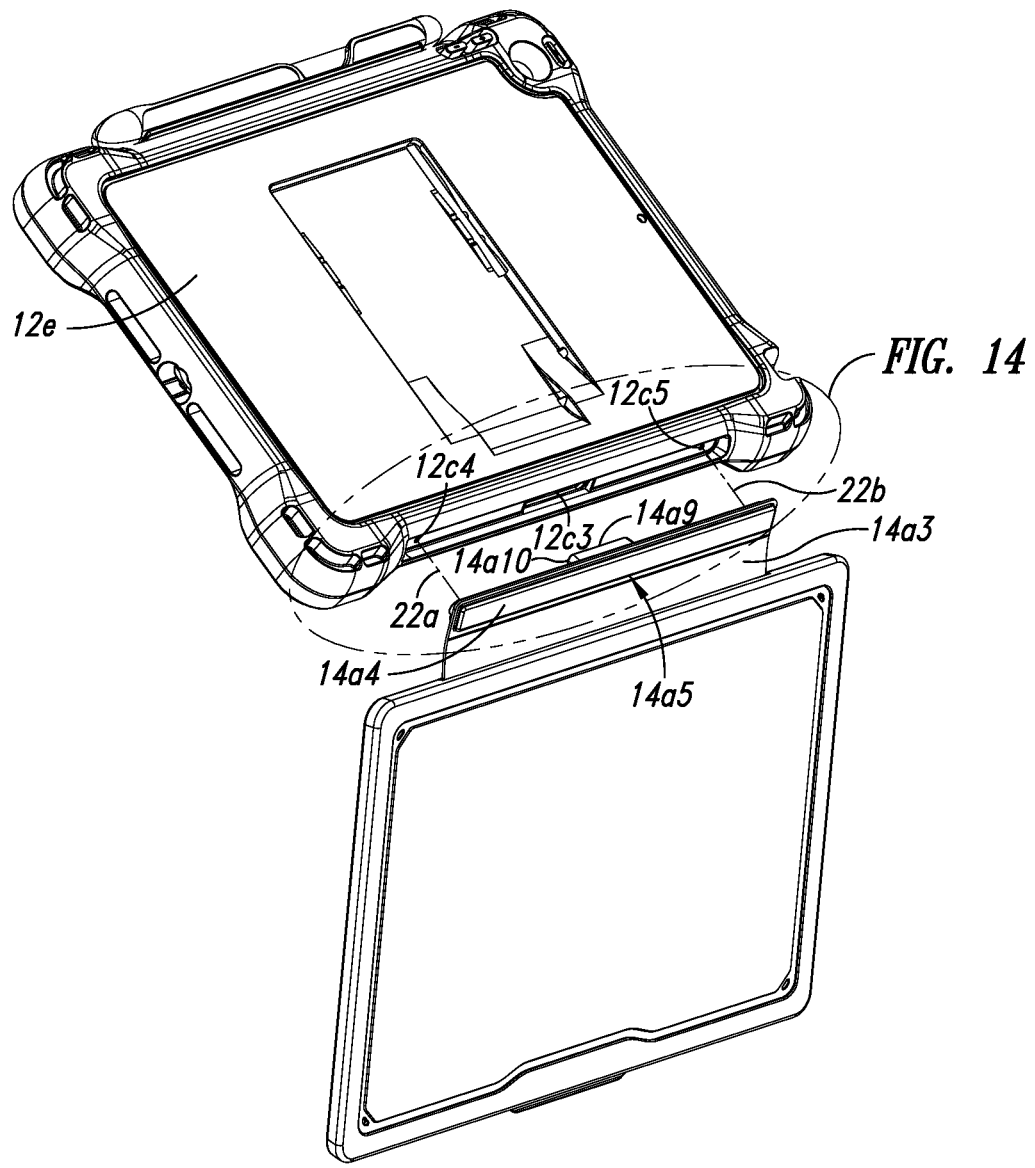
FIG. 13 is a posterior perspective view of the tablet case assembly second implementation of FIG. 9.

Turning to FIG. 13, depicted therein is a posterior perspective view of the tablet case assembly 10 second implementation of FIG. 9.

Figure 14:
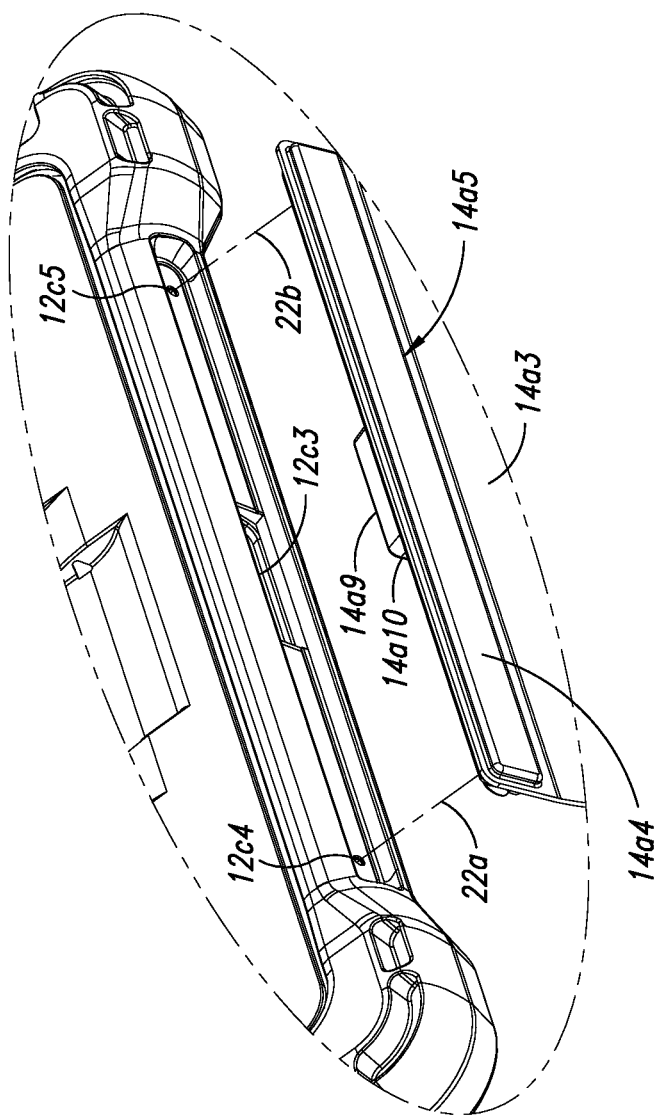
FIG. 14 is an enlarged posterior perspective view of the dashed-circle portion labeled "FIG. 10" in FIG. 9.

Turning to FIG. 14, depicted therein is an enlarged posterior perspective view of the tablet case assembly 10 second implementation labeled "FIG. 10" in FIG. 9.

Turning to FIG. 15, depicted therein is an anterior perspective view of the tablet case assembly 10 containing a tablet computing device 100.

Figure 16:
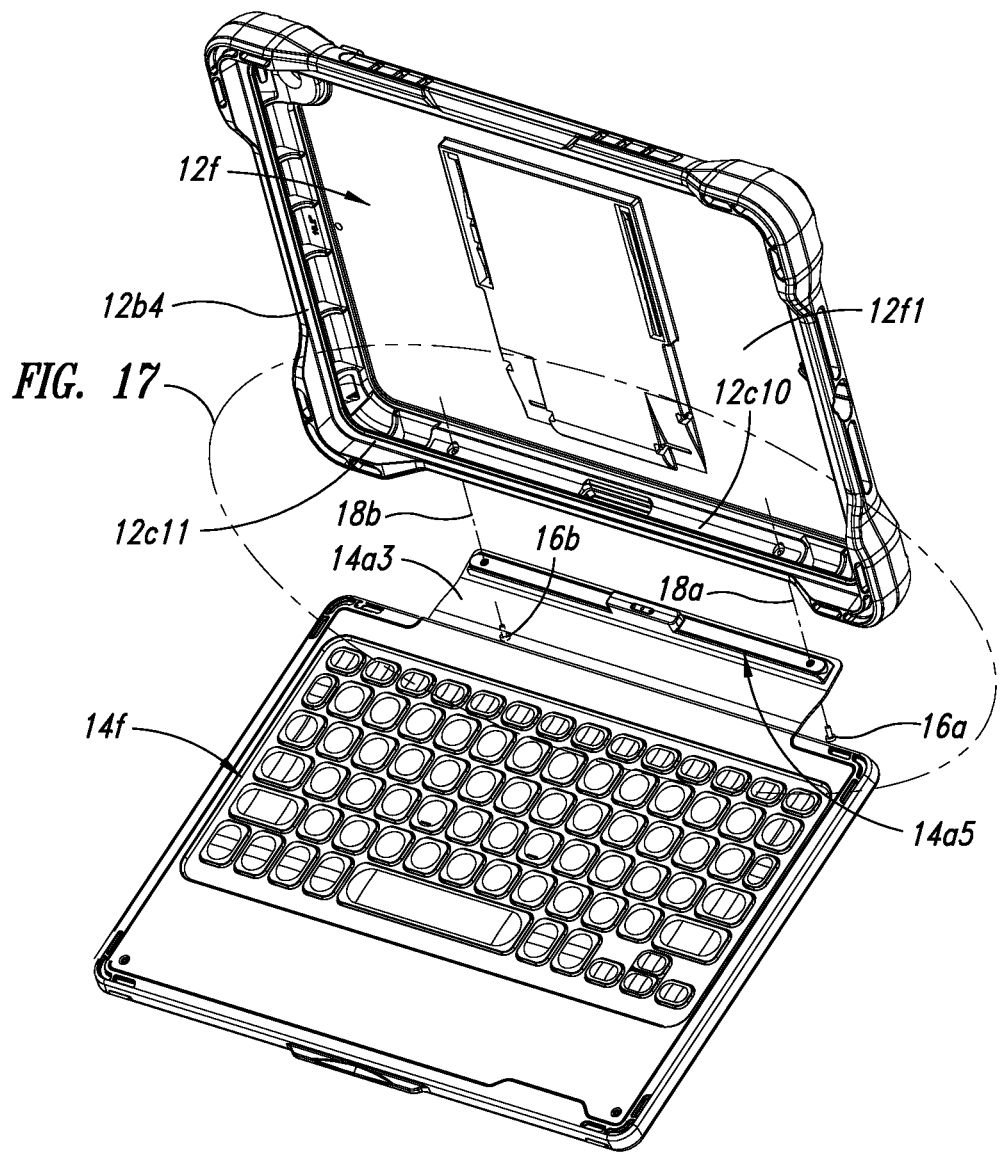
FIG. 16 is an anterior perspective view of a third implementation of a tablet case assembly.

Turning to FIG. 16, depicted therein is an anterior perspective view of a third implementation of the tablet case assembly 10.

Figure 17:
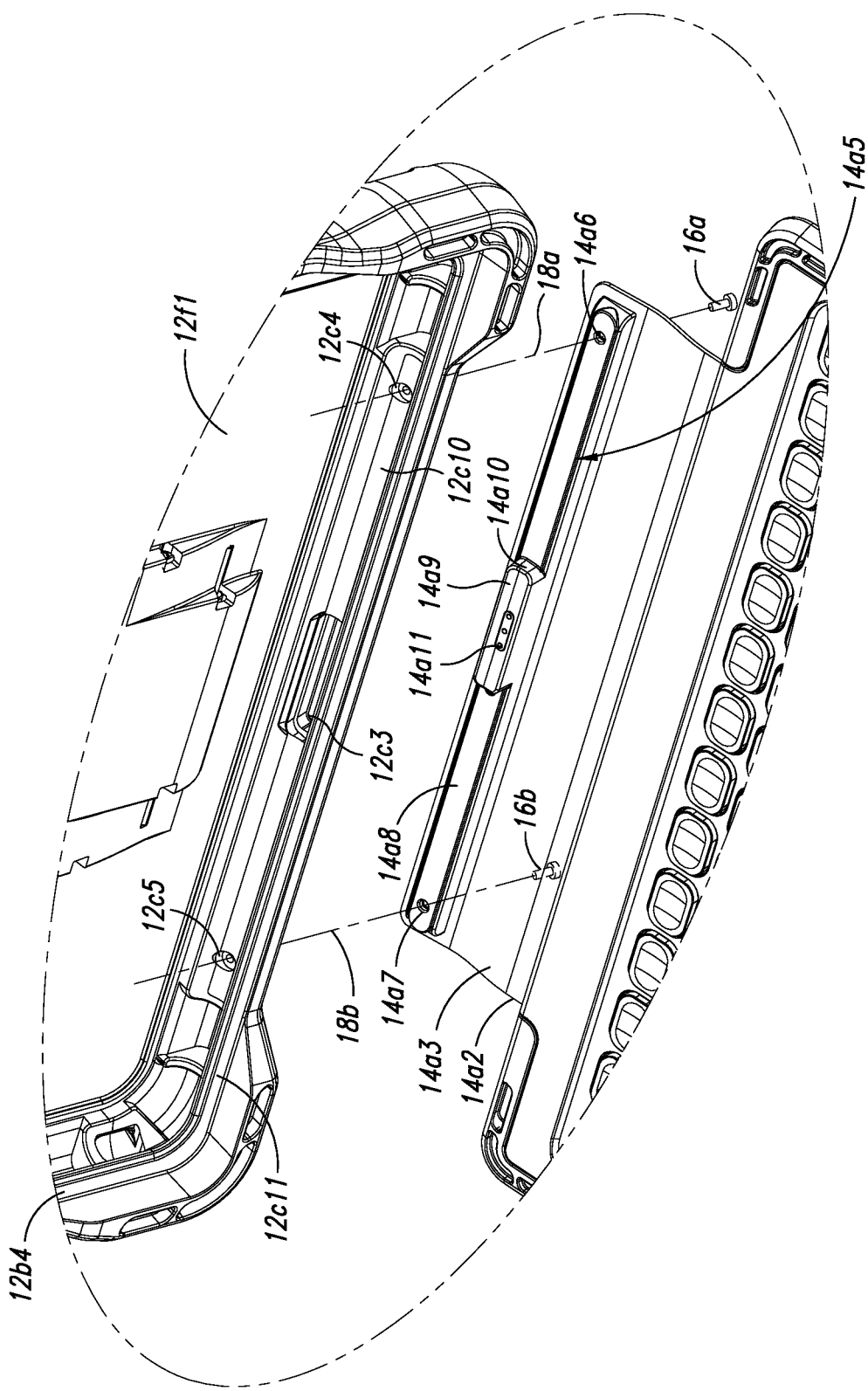
FIG. 17 is an enlarged anterior perspective view of the dashed-circle portion labeled "FIG. 17" in FIG. 16.

Turning to FIG. 17, depicted therein is an enlarged anterior perspective view of a portion of the tablet case assembly 10 third implementation demarcated by "FIG. 17" dashed lines of FIG. 16.

As shown by one or more of FIGS. 1-17, implementations can include tablet case assembly 10, which can include (I) case frame 12 configured to removably contain tablet computing device 100. The case frame 12 can include (A) interior back surface 12f1, and (B) first wall 12a, which can include first length La, anterior side 12a2, posterior side 12a1, proximate interior portion 12a3 of anterior side 12a2, and distal exterior portion 12a4 of anterior side 12a2. The proximate interior portion 12a3 of anterior side 12a2 can be distanced closer to interior back surface 12f1 than distal exterior portion 12a4 of anterior side 12a2 is distanced to interior back surface 12f1. The case frame 12 can include (C) second wall 12b, which can include first length Lb, anterior side 12b2, posterior side 12b1, proximate interior portion 12b3 of anterior side 12b2, and distal exterior portion 12b4 of anterior side 12b2. The proximate interior portion 12b3 of anterior side 12b2 can be distanced closer to interior back surface 12f1 than distal exterior portion 12b4 of anterior side 12b2 is distanced to interior back surface 12f1. The case frame 12 can include (D) third wall 12c, which can include first length Lc, anterior side 12c9, posterior side 12c8, proximate interior surface 12c10 of anterior side 12c9, and distal exterior portion 12c11 of anterior side 12c9. The proximate interior surface 12c10 of anterior side 12c9 can be distanced closer to interior back surface 12f1 than distal exterior portion 12c11 of anterior side 12c9 is distanced to interior back surface 12f1. The case frame 12 can include (E) fourth wall 12d, which can include first length Ld, anterior side 12d2, posterior side 12d1, and proximate interior portion 12d3 of anterior side 12d2, and distal exterior portion 12d4 of anterior side 12d2. The proximate interior portion 12d3 of anterior side 12d2 can be distanced closer to interior back surface 12f1 than distal exterior portion 12d4 of anterior side 12d2 is distanced to interior back surface 12f1. Furthermore, (i) first wall 12a can extend along first length La of first wall 12a parallel to first length Lc of third wall 12c, (ii) first wall 12a can extend along first length La of first wall 12a perpendicularly to first length Lb of second wall 12b and first length Ld of fourth wall 12d, (iii) first wall 12a, second wall 12b, third wall 12c, and fourth wall 12d can be coupled to interior back surface 12f1 to extend away therefrom with proximate interior portion 12a3 of anterior side 12a2 of first wall 12a. The proximate interior portion 12b3 of anterior side 12b2 of second wall 12b, proximate interior surface 12c10 of anterior side 12c9 of third wall 12c, and proximate interior portion 12d3 of anterior side 12d2 of fourth wall 12d along with interior back surface 12f1 at least in part can form a tablet containment area 12f that can be obscured from view when case frame 12 contains a tablet computing device 100. Furthermore, (iv) distal exterior portion 12a4 of anterior side 12a2 of first wall 12a, distal exterior portion 12b4 of anterior side 12b2 of second wall 12b, distal exterior portion 12c11 of anterior side 12c9 of third wall 12c, and distal exterior portion 12d4 of anterior side 12d2 of fourth wall 12d can be unobscured from view when case frame 12 contains a tablet computing device 100. The tablet case assembly 10 can include (II) a keyboard assembly 14, which can include (A) a keyboard 14f, and (B) an engagement member 14a5, which can be coupled to keyboard 14f. The engagement member 14a5 can be configured to removably engage with posterior side 12c8 of third wall 12c of case frame 12. The tablet case assembly 10 can include (III) at least one fastener 16a (e.g., alternatively, fastener 16b, fastener 20a, fastener 20b), which can be configured for removably securing engagement member 14a5 of keyboard assembly 14 with posterior side 12c8 of third wall 12c of case frame 12.

Implementations can include engagement member 14a5 including exterior surface 14a4 and when fastener 16a (e.g., alternatively, fastener 16b) is removably securing the engagement member 14a5 with posterior side 12c8 of third wall 12c of case frame 12, fastener 16a (e.g., alternatively, fastener 16b) can be only accessible from the exterior surface 14a4 of the engagement member 14a5.

Implementations can include posterior side 12c8 of third wall 12c of case frame 12 including an exterior third wall surface 12c7 and at least one aperture of first type 12c1 (e.g., alternatively, aperture of first type 12c2), aperture of first type 12c1 (e.g., alternatively, aperture of first type 12c2) having an opening being planarly collocated with exterior third wall surface 12c7 of case frame 12 to receive fastener 16a (e.g., alternatively, fastener 16b) when fastener 16a (e.g., alternatively, fastener 16b) is removably securing engagement member 14a5 with posterior side 12c8 of third wall 12c of case frame 12.

Implementations can include when fastener 20a (e.g., alternatively, fastener 20b) is removably securing engagement member 14a5 with posterior side 12c8 of third wall 12c of case frame 12, fastener 20a (e.g., alternatively, fastener 20b) is only accessible from proximate interior surface 12c10 of anterior side 12d2 of third wall 12c of case frame 12.

Implementations can include proximate interior surface 12c10 of anterior side 12d2 of third wall 12c of case frame 12 including at least one aperture of second type 12c4 (e.g., alternatively, aperture of second type 12c5), aperture of second type 12c4 (e.g., alternatively, aperture of second type 12c5) having an opening planarly collocated with proximate interior surface 12c10 to receive fastener 20a (e.g., alternatively, fastener 20b) when fastener 20a (e.g., alternatively, fastener 20b) is removably securing engagement member 14a5 with posterior side 12c8 of third wall 12c of case frame 12.

Implementations can include aperture of second type 12c4 (e.g., alternatively, aperture of second type 12c5) being without an opening being planarly collocated with exterior third wall surface 12c7 of case frame 12.

Implementations can include a tablet computing device 100 being contained by tablet containment area 12f of case frame 12, wherein when fastener 20a (e.g., alternatively, fastener 20b) is removably securing engagement member 14a5 with posterior side 12c8 of third wall 12c of case frame 12, fastener 20a (e.g., alternatively, fastener 20b) can be blocked by tablet computing device 100 from being accessible from proximate interior surface 12c10 of anterior side 12d2 of third wall 12c of case frame 12.

Implementations can include when fastener 20a (e.g., alternatively, fastener 20b) is removably securing engagement member 14a5 with posterior side 12c8 of third wall 12c of case frame 12, fastener 20a (e.g., alternatively, fastener 20b) is being only accessible from proximate interior surface 12c10 of anterior side 12d2 of third wall 12c of case frame 12 if tablet computing device 100 is removed from being contained by tablet containment area 12f of case frame 12.

Implementations can include fastener 16a (e.g., alternatively, fastener 20a) wherein the engagement member 14a5 includes exterior surface 14a4 and when fastener 16a (e.g., alternatively, fastener 16b) is removably securing engagement member 14a5 with posterior side 12c8 of third wall 12c of case frame 12, fastener 16a (e.g., alternatively, fastener 16b) can be only accessible from the exterior surface 14a4 of the engagement member 14a5.

Implementations can include tablet computing device 100 being contained by tablet containment area 12f of case frame 12 wherein anterior side 12d2 of third wall 12c of case frame 12 can include aperture of second type 12c4 (e.g., alternatively, aperture of second type 12c5), aperture of second type 12c4 (e.g., alternatively, aperture of second type 12c5) having an opening planarly collocated with proximate interior surface 12c10 to receive fastener 20a (e.g., alternatively, fastener 20b), and wherein aperture of second type 12c4 (e.g., alternatively, aperture of second type 12c5) can be blocked by the tablet computing device 100 from being accessible.

Implementations can include fastener 20a, wherein posterior side 12c8 of third wall 12c of case frame 12 includes an exterior third wall surface 12c7 and at least one aperture of first type 12c1 (e.g., alternatively, aperture of first type 12c2), aperture of first type 12c1 (e.g., alternatively, aperture of first type 12c2) having axis line of first type 18a (e.g., alternatively, axis line of first type 18b) and an opening being planarly collocated with the exterior third wall surface 12c7 of case frame 12 to receive fastener 16a (e.g., alternatively, fastener 20a) when fastener 16a (e.g., alternatively, fastener 20a) is removably securing engagement member 14a5 with posterior side 12c8 of third wall 12c of case frame 12, and wherein proximate interior surface 12c10 of anterior side 12d2 of third wall 12c of case frame 12 includes aperture of second type 12c4 (e.g., alternatively, aperture of second type 12c5), aperture of second type 12c4 (e.g., alternatively, aperture of second type 12c5) having axis line of second type 22a (e.g., alternatively, axis line of second type 22b) and an opening planarly collocated with proximate interior surface 12c10 to receive at least one second fastener 20a (e.g., alternatively, fastener 20b) when fastener 20a (e.g., alternatively, fastener 20b) is removably securing engagement member 14a5 with posterior side 12c8 of third wall 12c of case frame 12, wherein axis line of first type 18a (e.g., alternatively, axis line of first type 18b) and axis line of second type 22a (e.g., alternatively, axis line of second type 22b) share a common axis.

Implementations can include fastener 20a, wherein posterior side 12c8 of third wall 12c of case frame 12 includes exterior third wall surface 12c7 and aperture of first type 12c1 (e.g., alternatively, aperture of first type 12c2). The aperture of first type 12c1 (e.g., alternatively, aperture of first type 12c2) can have axis line of first type 18a (e.g., alternatively, axis line of first type 18b) and an opening being planarly collocated with exterior third wall surface 12c7 of case frame 12 to receive fastener 16a (e.g., alternatively, fastener 20a) when fastener 16a (e.g., alternatively, fastener 20a) is removably securing engagement member 14a5 with posterior side 12c8 of third wall 12c of case frame 12. The proximate interior surface 12c10 of anterior side 12d2 of third wall 12c of case frame 12 can include aperture of second type 12c4 (e.g., alternatively, aperture of second type 12c5). The aperture of second type 12c4 (e.g., alternatively, aperture of second type 12c5) can have axis line of second type 22a (e.g., alternatively, axis line of second type 22b) and an opening planarly collocated with the proximate interior surface 12c10 to receive second fastener 20a (e.g., alternatively, fastener 20b) when second fastener 20a (e.g., alternatively, fastener 20b) is removably securing engagement member 14a5 with posterior side 12c8 of third wall 12c of case frame 12, wherein axis line of first type 18a (e.g., alternatively, axis line of first type 18b) and axis line of second type 22a (e.g., alternatively, axis line of second type 22b) can be parallel to one another and displaced from one another.

Implementations can include fastener 16a (e.g., alternatively, fastener 16b, fastener 20a, fastener 20b) including at least one fastener type selected from the following list of fastener types: screw, bolt, nail, push clip, and peg.

As shown by one or more of FIGS. 1-17, implementations of a system can include tablet case assembly 10, which can include (I) case frame 12 configured to removably contain tablet computing device 100. The case frame 12 can include (A) interior back surface 12f1, (D) third wall 12c, which can include first length Lc, anterior side 12c9, posterior side 12c8, proximate interior surface 12c10 of anterior side 12c9, and distal exterior portion 12c11 of anterior side 12c9. The proximate interior surface 12c10 of anterior side 12c9 can be distanced closer to interior back surface 12f1 than distal exterior portion 12c11 of anterior side 12c9 is distanced to interior back surface 12f1. Furthermore, (iii) third wall 12c can be coupled to interior back surface 12f1 to extend away therefrom with proximate interior surface 12c10 of anterior side 12c9 of third wall 12c along with interior back surface 12f1 at least in part forming a tablet containment area 12f that is obscured from view when case frame 12 contains a tablet computing device 100. The tablet case assembly 10 can include (II) keyboard assembly 14, which can include (A) keyboard 14f, (B) engagement member 14a5 coupled to keyboard 14f. The engagement member 14a5 can be configured to removably engage with posterior side 12c8 of third wall 12c of case frame 12. The tablet case assembly 10 can include (III) fastener 16a (e.g., alternatively, fastener 16b, fastener 20a, fastener 20b), which can be configured for removably securing engagement member 14a5 of keyboard assembly 14 with posterior side 12c8 of third wall 12c of case frame 12.

Implementations can include when fastener 20a (e.g., alternatively, fastener 20b) is removably securing engagement member 14a5 with posterior side 12c8 of third wall 12c of case frame 12, fastener 20a (e.g., alternatively, fastener 20b) is only accessible from the proximate interior surface 12c10 of anterior side 12d2 of third wall 12c of case frame 12.

Implementations can include proximate interior surface 12c10 of anterior side 12d2 of third wall 12c of case frame 12 including aperture of second type 12c4 (e.g., alternatively, aperture of second type 12c5), at least one aperture of second type 12c4 (e.g., alternatively, aperture of second type 12c5) having an opening planarly collocated with proximate interior surface 12c10 to receive fastener 20a (e.g., alternatively, fastener 20b) when fastener 20a (e.g., alternatively, fastener 20b) is removably securing engagement member 14a5 with posterior side 12c8 of third wall 12c of case frame 12.

Implementations can include tablet computing device 100 being contained by tablet containment area 12f of case frame 12, wherein when fastener 20a (e.g., alternatively, fastener 20b) is removably securing engagement member 14a5 with posterior side 12c8 of third wall 12c of case frame 12, fastener 20a (e.g., alternatively, fastener 20b) is being blocked by tablet computing device 100 from being accessible from proximate interior surface 12c10 of anterior side 12d2 of third wall 12c of case frame 12.

As shown by one or more of FIGS. 1-17, implementations can include tablet case assembly 10, which can include (I) case frame 12, which can include (D) third wall 12c, which can include first length Lc, anterior side 12c9, posterior side 12c8, proximate interior surface 12c10 of anterior side 12c9, and a distal exterior portion 12c11 of anterior side 12c9. The proximate interior surface 12c10 of anterior side 12c9 can be distanced closer to interior back surface 12f1 than distal exterior portion 12c11 of anterior side 12c9 is distanced to interior back surface 12f1. Furthermore, (iii) third wall 12c can be coupled to interior back surface 12f1. The proximate interior surface 12c10 of the anterior side 12c9 of the third wall 12c can at least in part form tablet containment area 12f that can be obscured from view when case frame 12 contains a tablet computing device 100. The tablet case assembly 10 can include (II) a keyboard assembly 14, which can include (A) a keyboard 14f, (B) an engagement member 14a5, which can be coupled to keyboard 14f. The engagement member 14a5 can be configured to removably engage with posterior side 12c8 of third wall 12c of case frame 12. The tablet case assembly 10 can include (III) at least one fastener 16a (e.g., alternatively, fastener 16b, fastener 20a, fastener 20b), which can be configured for removably securing engagement member 14a5 of keyboard assembly 14 with posterior side 12c8 of third wall 12c of case frame 12.

Implementations can include a tablet computing device 100 being contained by tablet containment area 12f of case frame 12 wherein anterior side 12d2 of third wall 12c of case frame 12 can include aperture of second type 12c4 (e.g., alternatively, aperture of second type 12c5). The aperture of second type 12c4 (e.g., alternatively, aperture of second type 12c5) can have an opening planarly collocated with proximate interior surface 12c10 to receive fastener 20a (e.g., alternatively, fastener 20b), and wherein aperture of second type 12c4 (e.g., alternatively, aperture of second type 12c5) can be blocked by tablet computing device 100 from being accessible.

Implementations can include fastener 20a, wherein posterior side 12c8 of third wall 12c of case frame 12 includes exterior third wall surface 12c7 and aperture of first type 12c1 (e.g., alternatively, aperture of first type 12c2). The aperture of first type 12c1 (e.g., alternatively, aperture of first type 12c2) can have axis line of first type 18a (e.g., alternatively, axis line of first type 18b) and an opening being planarly collocated with exterior third wall surface 12c7 of case frame 12 to receive fastener 16a (e.g., alternatively, fastener 20a) when fastener 16a (e.g., alternatively, fastener 20a) is removably securing engagement member 14a5 with posterior side 12c8 of third wall 12c of case frame 12. The proximate interior surface 12c10 of anterior side 12d2 of third wall 12c of case frame 12 can include aperture of second type 12c4 (e.g., alternatively, aperture of second type 12c5). The aperture of second type 12c4 (e.g., alternatively, aperture of second type 12c5) can have an axis line of second type 22a (e.g., alternatively, axis line of second type 22b) and an opening planarly collocated with proximate interior surface 12c10 to receive fastener 20a (e.g., alternatively, fastener 20b) when fastener 20a (e.g., alternatively, fastener 20b) is removably securing engagement member 14a5 with posterior side 12c8 of third wall 12c of case frame 12. The axis line of first type 18a (e.g., alternatively, axis line of first type 18b) and axis line of second type 22a (e.g., alternatively, axis line of second type 22b) can share a common axis.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system comprising:
a tablet case assembly including:
(I) a case frame configured to removably contain a tablet computing device, the case frame including
   (A) an interior back surface,
   (B) a first wall including a first length, an anterior side, a posterior side, a proximate interior portion of the anterior side, and a distal exterior portion of the anterior side, the proximate interior portion of anterior side distanced closer to the interior back surface than the distal exterior portion of the anterior side is distanced to the interior back surface,
   (C) a second wall including a first length, an anterior side, a posterior side, a proximate interior portion of the anterior side, and a distal exterior portion of the anterior side, the proximate interior portion of the anterior side distanced closer to the interior back surface than the distal exterior portion of the anterior side is distanced to the interior back surface,
   (D) a third wall including a first length, an anterior side, a posterior side, a proximate interior surface of the anterior side, and a distal exterior portion of the anterior side, the proximate interior surface of the anterior side distanced closer to the interior back surface than the distal exterior portion of the anterior side is distanced to the interior back surface,
   (E) a fourth wall including a first length, an anterior side, a posterior side, and a proximate interior portion of the anterior side, and a distal exterior portion of the anterior side, the proximate interior portion of the anterior side distanced closer to the interior back surface than the distal exterior portion of the anterior side is distanced to the interior back surface,
      (i) the first wall extending along the first length of the first wall parallel to the first length of the third wall,
      (ii) the first wall extending along the first length of the first wall perpendicularly to the first length of the second wall and the first length of the fourth wall,
      (iii) the first wall, the second wall, the third wall, and the fourth wall coupled to the interior back surface to extend away therefrom with the proximate interior portion of the anterior side of the first wall, the proximate interior portion of the anterior side of the second wall, the proximate interior surface of the anterior side of the third wall, and the proximate interior portion of the anterior side of the fourth wall along with the interior back surface at least in part forming a tablet containment area that is obscured from view when the case frame contains a tablet computing device,
      (iv) the distal exterior portion of the anterior side of the first wall, the distal exterior portion of the anterior side of the second wall, the distal exterior portion of the anterior side of the third wall, and the distal exterior portion of the anterior side of the fourth wall being unobscured from view when the case frame contains a tablet computing device,
(II) a keyboard assembly including
   (A) a keyboard,
   (B) an engagement member coupled to the keyboard, the engagement member configured to removably engage with the posterior side of the third wall of the case frame, and
(III) at least one fastener configured for removably securing the engagement member of the keyboard assembly with the posterior side of the third wall of the case frame,
wherein when the at least one fastener is removably securing the engagement member with the posterior side of the third wall of the case frame, the at least one fastener is only accessible from the proximate interior surface of the anterior side of the third wall of the case frame,
wherein the proximate interior surface of the anterior side of the third wall of the case frame includes at least one aperture of second type, the at least one aperture of second type having an opening planarly collocated with the proximate interior surface to receive the at least one fastener when the at least one fastener is removably securing the engagement member with the posterior side of the third wall of the case frame.

2. The system of claim 1 wherein the engagement member includes an exterior surface and when the at least one fastener is removably securing the engagement member with the posterior side of the third wall of the case frame, the at least one fastener is only accessible from the exterior surface of the engagement member.

3. The system of claim 2 wherein the posterior side of the third wall of the case frame includes an exterior third wall surface and at least one aperture of first type, the at least one aperture of first type having an opening being planarly collocated with the exterior third wall surface of the case frame to receive the at least one fastener when the at least one fastener is removably securing the engagement member with the posterior side of the third wall of the case frame.

4. The system of claim 1 wherein the at least one aperture of second type being without an opening being planarly collocated with the exterior third wall surface of the case frame.

5. A system comprising:
a tablet case assembly including:
(I) a case frame configured to removably contain a tablet computing device, the case frame including
   (A) an interior back surface, (B) a first wall including a first length, an anterior side, a posterior side, a proximate interior portion of the anterior side, and a distal exterior portion of the anterior side, the proximate interior portion of anterior side distanced closer to the interior back surface than the distal exterior portion of the anterior side is distanced to the interior back surface, (C) a second wall including a first length, an anterior side, a posterior side, a proximate interior portion of the anterior side, and a distal exterior portion of the anterior side, the proximate interior portion of the anterior side distanced closer to the interior back surface than the distal exterior portion of the anterior side is distanced to the interior back surface, (D) a third wall including a first length, an anterior side, a posterior side, a proximate interior surface of the anterior side, and a distal exterior portion of the anterior side, the proximate interior surface of the anterior side distanced closer to the interior back surface than the distal exterior portion of the anterior side is distanced to the interior back surface, (E) a fourth wall including a first length, an anterior side, a posterior side, and a proximate interior portion of the anterior side, and a distal exterior portion of the anterior side, the proximate interior portion of the anterior side distanced closer to the interior back surface than the distal exterior portion of the anterior side is distanced to the interior back surface, (i) the first wall extending along the first length of the first wall parallel to the first length of the third wall, (ii) the first wall extending along the first length of the first wall perpendicularly to the first length of the second wall and the first length of the fourth wall, (iii) the first wall, the second wall, the third wall, and the fourth wall coupled to the interior back surface to extend away therefrom with the proximate interior portion of the anterior side of the first wall, the proximate interior portion of the anterior side of the second wall, the proximate interior surface of the anterior side of the third wall, and the proximate interior portion of the anterior side of the fourth wall along with the interior back surface at least in part forming a tablet containment area that is obscured from view when the case frame contains a tablet computing device, (iv) the distal exterior portion of the anterior side of the first wall, the distal exterior portion of the anterior side of the second wall, the distal exterior portion of the anterior side of the third wall, and the distal exterior portion of the anterior side of the fourth wall being unobscured from view when the case frame contains a tablet computing device, (II) a keyboard assembly including
  (A) a keyboard,
  (B) an engagement member coupled to the keyboard, the engagement member configured to removably engage with the posterior side of the third wall of the case frame, and (III) at least one fastener configured for removably securing the engagement member of the keyboard assembly with the posterior side of the third wall of the case frame;

a tablet computing device being contained by the tablet containment area of the case frame, wherein when the at least one fastener is removably securing the engagement member with the posterior side of the third wall of the case frame, the at least one fastener is being blocked by the tablet computing device from being accessible from the proximate interior surface of the anterior side of the third wall of the case frame, wherein when the at least one fastener is removably securing the engagement member with the posterior side of the third wall of the case frame, the at least one fastener is being only accessible from the proximate interior surface of the anterior side of the third wall of the case frame if the tablet computing device removed from being contained by the tablet containment area of the case frame; and at least one second fastener wherein the engagement member includes an exterior surface and when the at least one second fastener is removably securing the engagement member with the posterior side of the third wall of the case frame the at least one second fastener is only accessible from the exterior surface of the engagement member.

6. A system comprising:
a tablet case assembly including:
(I) a case frame configured to removably contain a tablet computing device, the case frame including
  (A) an interior back surface,
  (B) a first wall including a first length, an anterior side, a posterior side, a proximate interior portion of the anterior side, and a distal exterior portion of the anterior side, the proximate interior portion of anterior side distanced closer to the interior back surface than the distal exterior portion of the anterior side is distanced to the interior back surface,
  (C) a second wall including a first length, an anterior side, a posterior side, a proximate interior portion of the anterior side, and a distal exterior portion of the anterior side, the proximate interior portion of the anterior side distanced closer to the interior back surface than the distal exterior portion of the anterior side is distanced to the interior back surface,
  (D) a third wall including a first length, an anterior side, a posterior side, a proximate interior surface of the anterior side, and a distal exterior portion of the anterior side, the proximate interior surface of the anterior side distanced closer to the interior back surface than the distal exterior portion of the anterior side is distanced to the interior back surface,
  (E) a fourth wall including a first length, an anterior side, a posterior side, and a proximate interior portion of the anterior side, and a distal exterior portion of the anterior side, the proximate interior portion of the anterior side distanced closer to the interior back surface than the distal exterior portion of the anterior side is distanced to the interior back surface,
    (i) the first wall extending along the first length of the first wall parallel to the first length of the third wall,
    (ii) the first wall extending along the first length of the first wall perpendicularly to the first length of the second wall and the first length of the fourth wall,
    (iii) the first wall, the second wall, the third wall, and the fourth wall coupled to the interior back surface to extend away therefrom with the proximate interior portion of the anterior side of the first wall, the proximate interior portion of the anterior side of the second wall, the proximate interior surface of the anterior side of the third wall, and the proximate interior portion of the anterior side of the fourth wall along with the interior back surface at least in part forming a tablet containment area that is obscured from view when the case frame contains a tablet computing device,
  (iv) the distal exterior portion of the anterior side of the first wall, the distal exterior portion of the anterior side of the second wall, the distal exterior portion of the anterior side of the third wall, and the distal exterior portion of the anterior side of the fourth wall being unobscured from view when the case frame contains a tablet computing device,
(II) a keyboard assembly including
  (A) a keyboard,
  (B) an engagement member coupled to the keyboard, the engagement member configured to removably engage with the posterior side of the third wall of the case frame; and
(III) at least one fastener configured for removably securing the engagement member of the keyboard assembly with the posterior side of the third wall of the case frame; and
a tablet computing device being contained by the tablet containment area of the case frame
wherein the anterior side of the third wall of the case frame includes at least one aperture of second type, the at least one aperture of second type having an opening planarly collocated with the proximate interior surface to receive the at least one fastener, and
wherein the at least one aperture of second type is blocked by the tablet computing device from being accessible.

7. A system comprising:
a tablet case assembly including:
(I) a case frame configured to removably contain a tablet computing device, the case frame including
  (A) an interior back surface,
  (B) a first wall including a first length, an anterior side, a posterior side, a proximate interior portion of the anterior side, and a distal exterior portion of the anterior side, the proximate interior portion of anterior side distanced closer to the interior back surface than the distal exterior portion of the anterior side is distanced to the interior back surface,
  (C) a second wall including a first length, an anterior side, a posterior side, a proximate interior portion of the anterior side, and a distal exterior portion of the anterior side, the proximate interior portion of the anterior side distanced closer to the interior back surface than the distal exterior portion of the anterior side is distanced to the interior back surface,
  (D) a third wall including a first length, an anterior side, a posterior side, a proximate interior surface of the anterior side, and a distal exterior portion of the anterior side, the proximate interior surface of the anterior side distanced closer to the interior back surface than the distal exterior portion of the anterior side is distanced to the interior back surface,
  (E) a fourth wall including a first length, an anterior side, a posterior side, and a proximate interior portion of the anterior side, and a distal exterior portion of the anterior side, the proximate interior portion of the anterior side distanced closer to the interior back surface than the distal exterior portion of the anterior side is distanced to the interior back surface,
    (i) the first wall extending along the first length of the first wall parallel to the first length of the third wall,
    (ii) the first wall extending along the first length of the first wall perpendicularly to the first length of the second wall and the first length of the fourth wall,
    (iii) the first wall, the second wall, the third wall, and the fourth wall coupled to the interior back surface to extend away therefrom with the proximate interior portion of the anterior side of the first wall, the proximate interior portion of the anterior side of the second wall, the proximate interior surface of the anterior side of the third wall, and the proximate interior portion of the anterior side of the fourth wall along with the interior back surface at least in part forming a tablet containment area that is obscured from view when the case frame contains a tablet computing device,
    (iv) the distal exterior portion of the anterior side of the first wall, the distal exterior portion of the anterior side of the second wall, the distal exterior portion of the anterior side of the third wall, and the distal exterior portion of the anterior side of the fourth wall being unobscured from view when the case frame contains a tablet computing device,
(II) a keyboard assembly including
  (A) a keyboard,
  (B) an engagement member coupled to the keyboard, the engagement member configured to removably engage with the posterior side of the third wall of the case frame; and
(III) at least one fastener configured for removably securing the engagement member of the keyboard assembly with the posterior side of the third wall of the case frame; and
at least one second fastener,
wherein the posterior side of the third wall of the case frame includes an exterior third wall surface and at least one aperture of first type, the at least one aperture of first type having an axis line of first type and an opening being planarly collocated with the exterior third wall surface of the case frame to receive the at least one fastener when the at least one fastener is removably securing the engagement member with the posterior side of the third wall of the case frame, and
wherein the proximate interior surface of the anterior side of the third wall of the case frame includes at least one aperture of second type, the at least one aperture of second type having an axis line of second type and an opening planarly collocated with the proximate interior surface to receive the at least one second fastener when the at least one second fastener is removably securing the engagement member with the posterior side of the third wall of the case frame,
wherein the axis line of first type and the axis line of second type share a common axis.

8. A system comprising:
a tablet case assembly including:
(I) a case frame configured to removably contain a tablet computing device, the case frame including
  (A) an interior back surface,
  (B) a first wall including a first length, an anterior side, a posterior side, a proximate interior portion of the anterior side, and a distal exterior portion of the anterior side, the proximate interior portion of anterior side distanced closer to the interior back surface than the distal exterior portion of the anterior side is distanced to the interior back surface, (C) a second wall including a first length, an anterior side, a posterior side, a proximate interior portion of the anterior side, and a distal exterior portion of the anterior side, the proximate interior portion of the anterior side distanced closer to the interior back surface than the distal exterior portion of the anterior side is distanced to the interior back surface, (D) a third wall including a first length, an anterior side, a posterior side, a proximate interior surface of the anterior side, and a distal exterior portion of the anterior side, the proximate interior surface of the anterior side distanced closer to the interior back surface than the distal exterior portion of the anterior side is distanced to the interior back surface, (E) a fourth wall including a first length, an anterior side, a posterior side, and a proximate interior portion of the anterior side, and a distal exterior portion of the anterior side, the proximate interior portion of the anterior side distanced closer to the interior back surface than the distal exterior portion of the anterior side is distanced to the interior back surface, (i) the first wall extending along the first length of the first wall parallel to the first length of the third wall,
  (ii) the first wall extending along the first length of the first wall perpendicularly to the first length of the second wall and the first length of the fourth wall,
  (iii) the first wall, the second wall, the third wall, and the fourth wall coupled to the interior back surface to extend away therefrom with the proximate interior portion of the anterior side of the first wall, the proximate interior portion of the anterior side of the second wall, the proximate interior surface of the anterior side of the third wall, and the proximate interior portion of the anterior side of the fourth wall along with the interior back surface at least in part forming a tablet containment area that is obscured from view when the case frame contains a tablet computing device,
  (iv) the distal exterior portion of the anterior side of the first wall, the distal exterior portion of the anterior side of the second wall, the distal exterior portion of the anterior side of the third wall, and the distal exterior portion of the anterior side of the fourth wall being unobscured from view when the case frame contains a tablet computing device, (II) a keyboard assembly including
  (A) a keyboard,
  (B) an engagement member coupled to the keyboard, the engagement member configured to removably engage with the posterior side of the third wall of the case frame; and (III) at least one fastener configured for removably securing the engagement member of the keyboard assembly with the posterior side of the third wall of the case frame; and at least one second fastener, wherein the posterior side of the third wall of the case frame includes an exterior third wall surface and at least one aperture of first type, the at least one aperture of first type having an axis line of first type and an opening being planarly collocated with the exterior third wall surface of the case frame to receive the at least one fastener when the at least one fastener is removably securing the engagement member with the posterior side of the third wall of the case frame, and wherein the proximate interior surface of the anterior side of the third wall of the case frame includes at least one aperture of second type, the at least one aperture of second type having an axis line of second type and an opening planarly collocated with the proximate interior surface to receive the at least one second fastener when the at least one second fastener is removably securing the engagement member with the posterior side of the third wall of the case frame, wherein the axis line of first type and the axis line of second type are parallel to one another and displaced from one another.

9. A system comprising:
a tablet case assembly including:
(I) a case frame configured to removably contain a tablet computing device, the case frame including
  (A) an interior back surface,
  (D) a third wall including a first length, an anterior side, a posterior side, a proximate interior surface of the anterior side, and a distal exterior portion of the anterior side, the proximate interior surface of the anterior side distanced closer to the interior back surface than the distal exterior portion of the anterior side is distanced to the interior back surface,
    (iii) the third wall coupled to the interior back surface to extend away therefrom with the proximate interior surface of the anterior side of the third wall along with the interior back surface at least in part forming a tablet containment area that is obscured from view when the case frame contains a tablet computing device, (II) a keyboard assembly including
  (A) a keyboard,
  (B) an engagement member coupled to the keyboard, the engagement member configured to removably engage with the posterior side of the third wall of the case frame; and (III) at least one fastener configured for removably securing the engagement member of the keyboard assembly with the posterior side of the third wall of the case frame, wherein when the at least one fastener is removably securing the engagement member with the posterior side of the third wall of the case frame, the at least one fastener is only accessible from the proximate interior surface of the anterior side of the third wall of the case frame, wherein the proximate interior surface of the anterior side of the third wall of the case frame includes at least one aperture of second type, the at least one aperture of second type having an opening planarly collocated with the proximate interior surface to receive the at least one fastener when the at least one fastener is removably securing the engagement member with the posterior side of the third wall of the case frame.

10. The system of claim 9 further comprising:
a tablet computing device being contained by the tablet containment area of the case frame, wherein when the at least one fastener is removably securing the engagement member with the posterior side of the third wall of the case frame, the at least one fastener is being blocked by the tablet computing device from being accessible from the proximate interior surface of the anterior side of the third wall of the case frame.

11. A system comprising:
a tablet case assembly including:
(I) a case frame including (D) a third wall including a first length, an anterior side, a posterior side, a proximate interior surface of the anterior side, and a distal exterior portion of the anterior side, the proximate interior surface of the anterior side distanced closer to the interior back surface than the distal exterior portion of the anterior side is distanced to the interior back surface,
   (iii) the third wall coupled to the interior back surface to extend away therefrom with the proximate interior surface of the anterior side of the third wall at least in part forming a tablet containment area that is obscured from view when the case frame contains a tablet computing device,
(II) a keyboard assembly including
   (A) a keyboard,
   (B) an engagement member coupled to the keyboard, the engagement member configured to removably engage with the posterior side of the third wall of the case frame; and
(III) at least one fastener configured for removably securing the engagement member of the keyboard assembly with the posterior side of the third wall of the case frame; and
a tablet computing device being contained by the tablet containment area of the case frame
wherein the anterior side of the third wall of the case frame includes at least one aperture of second type, the at least one aperture of second type having an opening planarly collocated with the proximate interior surface to receive the at least one fastener, and
wherein the at least one aperture of second type is blocked by the tablet computing device from being accessible.

12. A system comprising:
a tablet case assembly including:
(I) a case frame including
   (D) a third wall including a first length, an anterior side, a posterior side, a proximate interior surface of the anterior side, and a distal exterior portion of the anterior side, the proximate interior surface of the anterior side distanced closer to the interior back surface than the distal exterior portion of the anterior side is distanced to the interior back surface,
   (iii) the third wall coupled to the interior back surface to extend away therefrom with the proximate interior surface of the anterior side of the third wall at least in part forming a tablet containment area that is obscured from view when the case frame contains a tablet computing device,
(II) a keyboard assembly including
   (A) a keyboard,
   (B) an engagement member coupled to the keyboard, the engagement member configured to removably engage with the posterior side of the third wall of the case frame; and
(III) at least one fastener configured for removably securing the engagement member of the keyboard assembly with the posterior side of the third wall of the case frame; and
at least one second fastener,
wherein the posterior side of the third wall of the case frame includes an exterior third wall surface and at least one aperture of first type, the at least one aperture of first type having an axis line of first type and an opening being planarly collocated with the exterior third wall surface of the case frame to receive the at least one fastener when the at least one fastener is removably securing the engagement member with the posterior side of the third wall of the case frame, and
wherein the proximate interior surface of the anterior side of the third wall of the case frame includes at least one aperture of second type, the at least one aperture of second type having an axis line of second type and an opening planarly collocated with the proximate interior surface to receive the at least one second fastener when the at least one second fastener is removably securing the engagement member with the posterior side of the third wall of the case frame,
wherein the axis line of first type and the axis line of second type share a common axis.

\* \* \* \* \*